US006808562B2

(12) United States Patent
Bland

(10) Patent No.: US 6,808,562 B2
(45) Date of Patent: Oct. 26, 2004

(54) STABLE CONSOLIDATED COMBUSTION ASH MATERIAL

(75) Inventor: Alan E. Bland, Laramie, WY (US)

(73) Assignee: The University of Wyoming Research Corporation, Laramie, WY (US)

(*) Notice: Subject to any disclaimer, the term of this patent is extended or adjusted under 35 U.S.C. 154(b) by 0 days.

(21) Appl. No.: 10/327,595

(22) Filed: Dec. 19, 2002

(65) Prior Publication Data

US 2003/0188668 A1 Oct. 9, 2003

Related U.S. Application Data

(62) Division of application No. 10/034,361, filed on Dec. 28, 2001, now Pat. No. 6,517,631, which is a division of application No. 09/358,298, filed on Jul. 20, 1999, now Pat. No. 6,334,895.
(60) Provisional application No. 60/093,480, filed on Jul. 20, 1998.

(51) Int. Cl.[7] .............................................. C04B 18/06

(52) U.S. Cl. ................................. 106/705; 106/DIG. 1

(58) Field of Search ........................... 106/705, DIG. 1

(56) References Cited

U.S. PATENT DOCUMENTS

| | | | |
|---|---|---|---|
| 3,565,648 A | 2/1971 | Mori ........................... 106/89 |
| 3,765,920 A | 10/1973 | Humphrey .................. 106/288 |
| 3,989,534 A | 11/1976 | Plunguian et al. ............ 106/86 |
| 4,040,852 A | 8/1977 | Jones ........................... 106/97 |
| 4,250,134 A | 2/1981 | Minnick ..................... 264/140 |
| 4,344,796 A | 8/1982 | Minnick ....................... 106/84 |
| 4,374,672 A | 2/1983 | Funston ........................ 106/97 |
| 4,496,267 A | * | 1/1985 | Gnaedinger .................. 404/82 |
| 4,501,618 A | * | 2/1985 | Gebhard ................ 106/DIG. 1 |
| 4,618,376 A | 10/1986 | Saternus ....................... 134/26 |
| 4,624,711 A | 11/1986 | Styron ........................ 106/308 |
| 4,659,385 A | 4/1987 | Costopoulos et al. ......... 106/87 |
| 4,772,330 A | 9/1988 | Kobayashi et al. ......... 106/400 |

(List continued on next page.)

FOREIGN PATENT DOCUMENTS

CZ 273227 3/1991

OTHER PUBLICATIONS

ASTM, 1990 and 1994, *Annual Book of Standards,* vol. 04–05, American Society of Testing Materials, Philadelphia, PA.

Baker Engineering, Inc., 1990, "Waste Disposal/Utilization Study," United States Department of Energy, Morgantown Energy Technology Center, Morgantown, WV, DOE/MC/25042–2872, 335 pp.

Bates, R.H. and J.A. Jackson, 1984, *"Dictionary of Geological Terms,"* 3rd ed. Anchor Press/Doubleday, Garden City, New York.

(List continued on next page.)

*Primary Examiner*—Paul Marcantoni
(74) *Attorney, Agent, or Firm*—Santangelo Law Office, P.C

(57) ABSTRACT

This invention discloses a system for cold bond processing of combustion ash which enhances various characteristics of the resulting cured consolidated combustion ash materials. Specifically, the invention relates to processing techniques which enhances both density and strength of the of the consolidated combustion ash materials. The invention also relates to processing techniques which control various chemical reactions which assure that certain types of minerals are formed in the proper amounts which results in a cured consolidated combustion ash material which has greater dimensional stability and enhanced resistance to degradation. Embodiments for both normal weight and light weight combustion ash aggregates are disclosed which meet various ASTM and AASHTO specifications.

93 Claims, 17 Drawing Sheets

U.S. PATENT DOCUMENTS

| | | | | |
|---|---|---|---|---|
| 4,804,147 A | | 2/1989 | Hooper | 241/24 |
| 4,880,582 A | | 11/1989 | Spanjer et al. | 264/82 |
| 4,917,733 A | * | 4/1990 | Hansen | |
| 4,997,484 A | * | 3/1991 | Gravitt et al. | 106/708 |
| 5,002,611 A | | 3/1991 | Rademaker | 106/705 |
| 5,019,360 A | | 5/1991 | Lehto | 423/132 |
| 5,084,102 A | | 1/1992 | Browns et al. | 106/707 |
| 5,100,473 A | | 3/1992 | Mitsuda et al. | 106/705 |
| 5,106,422 A | | 4/1992 | Bennett | 106/705 |
| 5,137,753 A | * | 8/1992 | Bland et al. | 427/180 |
| 5,152,837 A | | 10/1992 | Rademaker | 106/705 |
| 5,166,109 A | | 11/1992 | Alpert et al. | 501/155 |
| 5,211,750 A | | 5/1993 | Smith et al. | 106/710 |
| 5,266,111 A | | 11/1993 | Barbour | 106/709 |
| 5,286,292 A | | 2/1994 | Tsukada et al. | 106/705 |
| 5,342,442 A | | 8/1994 | Nechvatal et al. | 106/409 |
| 5,350,549 A | | 9/1994 | Boyle | 264/40.4 |
| 5,364,572 A | | 11/1994 | Wu et al. | 264/40.1 |
| 5,374,307 A | | 12/1994 | Riddle | 106/705 |
| 5,383,521 A | | 1/1995 | Onan et al. | 166/293 |
| 5,387,739 A | * | 2/1995 | Pichat | 588/257 |
| 5,482,550 A | | 1/1996 | Strait | 106/677 |
| 5,484,479 A | | 1/1996 | Weber | 106/705 |
| 5,490,889 A | | 2/1996 | Kirkpatrick | 106/709 |
| 5,500,044 A | | 3/1996 | Meade et al. | 106/697 |
| 5,527,387 A | | 6/1996 | Andersen et al. | 106/693 |
| 5,538,553 A | | 7/1996 | Burgand et al. | 106/795 |
| 5,542,977 A | | 8/1996 | Hanst | 106/706 |
| 5,669,969 A | | 9/1997 | Meade et al. | 106/697 |
| 5,681,384 A | * | 10/1997 | Liskowitz | 106/710 |
| 5,693,137 A | * | 12/1997 | Styron | 106/706 |
| 5,704,972 A | | 1/1998 | Ivkovich | 106/710 |
| 5,714,003 A | * | 2/1998 | Styron | 106/705 |
| 5,766,338 A | | 6/1998 | Weber | 501/80 |
| 5,843,857 A | | 12/1998 | Kato | 501/80 |
| 5,849,075 A | | 12/1998 | Hopkins et al. | 106/705 |
| 5,853,475 A | | 12/1998 | Liskowitz et al. | 106/705 |
| 6,200,379 B1 | * | 3/2001 | Strabala | 106/705 |
| 6,334,895 B1 | * | 1/2002 | Bland | 106/705 |
| 6,419,740 B2 | * | 7/2002 | Kinari et al. | 106/705 |
| 6,517,631 B1 | * | 2/2003 | Bland | 106/705 |

OTHER PUBLICATIONS

Bland, A.E., C. E. Jones, J.G. Rose and J.L. Harness 1989, "Ash Management Options for AFBC," *Proc. 10th International Conference on Fluidized Bed Combustion,* San Francisco CA, Apr. 30–May 3, 1989, pp. 323–334.

Bland, A.E., R. K. Kissel and G. G. Ross, 1991, "Enhanced FBC Ash Management Using Pelletization," *Proc. 10th International Conference on Fluidized Bed Combustion,* Montreal, Canada, Apr., pp. 871–876.

Bland, A.E., R. Cox, A. Rowen, E.R. Lichty, and R.A. Schumann, 1993, "Pelletization as an Ash Management Option for CFBC Ash Handling and Utilization," *Proc., 12th International Conference on Fluidized Bed Combustion,* LaJolla, CA, May 8–13, 1993, pp. 1342350.

Bland, A.E., and A. Rowen, 1996, "Pelletization as a Mine Back–Haul or Aggregate production Ash Management Option" *Proc., 1995 International Ash Utilization Symposium,* Lexington, KY, Oct. 23–25, 1995.

Burnet, G. and A.J. Gokhale, 1987, "Experimental Studies of the Production of Lightweight Aggregate from Fly Ash/Coal Cleaning Refuse Mixtures," *Proc., Eighth International Ash Utilization Symposium,* EPRI–CS–5362, Oct. 28–31, 1987, pp. 611 to 61–15.

Hay, P. and Rademaker, P.D., 1987, "AARDALITE An Economical Lightweight Aggregate from Fly Ash," *Proc. Eighth International Ash Utilization Symposium,* EPIR–CS–5362, Oct. 28–31, 1987, pp. 571 to 58–7.

Rukavina, M., 1990, "Cement + Ash = New Aggregate," *Rock Products,* pp. 53–55.

Styron, R.W., 1987, "Fly Ash Lightweight Aggregate: The AGGLITE Process," *Proc. Eighth International Ash Utilization Symposium,* EPRI–CS–5362, Oct. 28–31, 1987, pp. 58–1 to 58–12.

Tepordel, V.V., 1993, "Construction Aggregates," *Mining Engineering,* Jun., 1993, pp. 567–568.

U.S. Department of the Interior, 1987, *Minerals Yearbook,* U.S. Bureau of Mines.

Bland, A.E., C.E. Jones, J.G. Rose and J.L. Harness, 1989, Ash Management Options For Bubbling Bed AFBC Technologies, *Proceedings ASME Joint Power Generation Conference:* Symposium on Ash Handling, Disposal and Utilization from Coal–Fired Fluidized Bed Boilers; Dallas, TX, Oct. 22–26, 1989, ASME Fact vol. 6, pp. 9–19.

Bland, A.E., R.K. Kissel and G.G. Ross, 1991, "Utilization of CFBC Ashes in Roller Compacted Concrete Applications" *Proceedings of 11th International Conference on Fluidized Bed Combustion,* ASME, Montreal, Canada, Apr. 21–24, 1991, pp. 857863.

"Technical Options for the Disposal Circulating Fluidized Bed Combustion Solid Wastes", Darbon Chemical Company Limited, Environment Canada, Mar. 1989, Final Report to Industrial Programs Branch, 142 pages.

Bland, A.E., and R.K. Kissel, 1989, "Laboratory Evaluation of CFBC Waste Disposal and Utilization Options." *Proc. of the 10th International Conference of Fluidized Bed Combustion,* ASME/San Francisco, CA, Apr. 30–May 3, 1989, pp. 1141–1148.

Georgiou, D.N., A.E. Bland, and D. Sundstrom, 1993, "Laboratory Evaluation Of A Low Sulfur Coal CFBC Residue As A Structural Fill." *Proc.,* 12th International Conference On Fluidized Bed Combustion, LaJolla, CA, May, 1993, pp. 629–639.

Bland, A.E., D.N. Georgiou, and E.J. Anthony, 1993, "Sea Water Conditioning of CFBC Ash." *Proc.,* 12 International Conference on Fluidized Bed Combustion, LaJolla, CA, pp. 835–846.

Burwell, S.M., R.K. Kissel, A.E. Bland, and D.M. Golden, 1993, "Fluidized Bed Combustion Ash Concrete." *Proc.,* 12 International Conference on Fluidized Bed Combustion, Jolla, CA, May 1993, pp. 847–858.

Blondin, J., E.J. Anthony and A.P. Iribarne, 1993, "A New Approach To Hydration Of FBC Residues." *Proc.,* 12 International Conference On Fluidized Bed Combustion, May 9–13, LaJolla, CA, vol. 2, pp. 847–858.

Georgiou, D.N., R.K. Kissel and G.G. Ross, 1991, "Geotechnical Characteistics and Landfilling of CFBC Residue," *Proc.,* 11 International Conference On Fluidized Bed Combustion, Apr. 1991, Montreal, Canada, pp. 849–855.

Anthony, E.J., A.P. Iribarne and J.V. Iribarne, 1995, "Study Of Hydration During Curing of Residues From Coal Combustion With Limestone Addition." *Proc.,* 13th International Conference On Fluidized Bed Combustion, Orlando, FL, pp. 1113–1121.

Weinberg, A., L. Holcombe and R. Butler. 1991, "Field Study Of Wastes From Fluidized Bed Combustion Technologies." Proc. 11th International Conference On Fluidized Bed Combustion, Montreal, Canada, Apr. 21–24, pp. 865–870.

"Standard Practice for Mechanical Mixing of Hydraulic Cement Pastes and Motars of Plastic Consistency", American Association State Highway and Transportation Officials Standard AASHTO No: T612 pp. 188–190.

Ross, G.G. R.K. Kissel, E.J. Anthony, and C.C. Doiron. 1989, "Field Demonstration Of Fluidized Bed Combustion Residue Management" *Proc.,* 10th International Conference on Fluidized Bed Combustion, San Francisco, CA, pp. 335–340.

W.E. Wolfe, "Laboratory Determination Of Engineering Properties Of Dry FGD By–Products." Abstract, Presented At Pittsburgh Coal Conference, Oct. 1992.

Iribarne, A.P., E.J. Anthony and J. Blondin. 1993, "The Phase Analysis Of Coal Combustion Residues." Proc. 12th International Conference On Fluidized Bed Combustion, LaJolla, CA, May 9–13, pp. 641–647.

Nechvatal, T. M., 1997, Manufacturing Lightweight Aggregate from Various Fly Ashes and Sludges Using the Minergy Process; $12^{th}$ International Symposium on Coal Combustion By–Product (CCB) Management and Use, Orlando FL, Jan. 26–30, 1997, American Coal Ash Association, Alexandria, VA, and Electric Power Research Institute, Palo Alto CA, pp. 73–1–73–11.

Nechvatal, T.M., 1995, Lightweight Aggregate Production from Fly ash and Waste Water Solids; *Proc.,* 11th International Symposium on Use and Mangement of Coal Combustion By–Products, Orlando FL, Jan. 15–19, 1995, American Coal Ash Association, Alexandria, VA, and Electric Power Research Institute, Palo Alto CA, pp. 52–1–52–4.

Terukina, J. and others, 1999, Characterisitics of Lightweight Concrete Manufactured from Ultra Light–Weight Aggregates Using Fly Ash; *Proc.,* Thirteenth International Symposium on Use and Management of Coal Combustion Products (CCPs), Orlando FL, Jan. 11–15, 1999, American Coal Ash Association, Alexandria, VA, pp. 45–1–45–14.

Terukina, J., and others, 1999, Manufacturing Process of Artificial Ultra Light–Weight Aggregates from Coal Fly Ash; *Proc.,* Thirteenth International Symposium on Use and Management of Coal Combustion Products (CCPs), Orlando FL, Jan. 11–15, 1999, American Coal Ash Association, Alexandria, VA, pp. 1–1–1–13.

Terukina, J., and others, 1999, Manufacturing Process of Artificial Ultra Light–Weight Aggregates from Coal Fly Ash–A Laboratory and Bench Scale Study; *Proc.,* Thirteenth International Symposium on Use and Management of Coal Combustion Products (CCPs), Orlando FL, Jan. 11–15, 1999, American Coal Ash Association, Alexandria, VA, pp. 7–1–7–11.

Shigetomi, M., Morishita, N and M. Kato, 1999, Characteristics of High Performance Aggregate Produced From Fly Ash using a Rotary Kiln and Properties of Concrete Used This Aggregate; *Proc.,* Thirteenth International Symposium on Use and Management of Coal Combustion Products (CCPs), Orlando FL, Jan. 11–15, 1999, American Coal Ash Association, Alexandria, VA, pp. 4–1–4–10.

Courts, G. D., 1991, The Aggregate of the Future is Here Today; Ninth International Ash Use Symposium, Orlando FL, Jan. 22–25, 1991, American Coal Ash Association, Alexandria, VA, and Electric Power Research Institute, Palo Alto CA, pp. 21–1–21–10.

Hay, P. D. and E. R. Dunstan, 1991, Lightweight Aggregate Production and Use in Florida; Ninth International Ash Use Symposium, Orlando FL, Jan. 22–25, 1991, American Coal Ash Association, Alexandria, VA, and Electric Power Research Institute, Palo Alto CA, pp. 22–1–22–10.

Wu, M. M., Winschel, R. A., Wasson G. E., and P. J. Yuran, 1995, properties of Synthetic Aggregates made from FBC and Dry FGD By–Products; *Supplemental Proc.,* $11^{th}$ International Symposium on Use and Management of Coal Combustion By–Products, Orlando FL, Jan. 15–19, 1995, American Coal Ash Association, Alexandria, VA, and Electric Power Research Institute, Palo Alto CA, pp. 55–1–55–11.

Wu, M. M., Winschle, R. A. and G. J. Hasenfus, 1999, Production of Manufactured Aggregates from Coal Combustion By–Products; *Proc.,* Thirteenth International Symposium on Use and Management of Coal Combustion Products (CCPs), Orlando FL, Jan. 11–15, 1999, American Coal Ash Association, Alexandria, VA, pp. 6–1–6–11.

Kashi, M.G., Awan, C.W., Holmstrom O.C. and R.A. Malloy, 1999, Innovative lightweight Synthetic Aggregates Developed form Coal Fly Ash; *Proc.,* Thirteenth International Symposium on Use and Management of Coal Combustion Products (CCPs), Orlando FL, Jan. 11–15, 1999, American Coal Ash Association, Alexandria, VA, pp. 5–1–5–14.

Sone, T. and others, 1995, Characteristics of Concrete Containing Artificial Coarse Aggregate using Coal Ash as Raw Material; *Proc.* $11^{th}$ International Symposium on Use and Management of Coal Combustion By–Products, Orlando FL, Jan. 15–19, 1995, American Coal Ash Association, Alexandria, VA, and Electric Power Research Institute, Palo Alto CA, pp. 53–1–5317.

Bergeson, K. L. and J.W. Waddingham, 1995, Synthetic Aggregates from Fly ash and AFBC By–Products; *Proc.* $11^{th}$ International Symposium on Use and Management of Coal Combustion By–Products, Orlando FL, Jan. 15–19, 1995, American Coal Ash Association, Alexandria, VA, and Electric Power Research Institute, Palo Alto CA, pp. 54–1–5440.

Stephens, J. and J. Nallick, 1995, Use of Class C Fly Ash in Lightweight Aggregate and Concrete masonry Units*Proc.,* $11^{th}$ International Symposium on Use and Management of Coal Combustion ByProducts, Orlando FL, Jan. 15–19, 1995, American Coal Ash Association, Alexandria, VA, and Electric Power Research Institute, Palo Alto CA, pp. 55–155–11.

Mulder, E. and A. S. M. Houtepen, 1991, Artificial Gravel as a Gravel Substitute in Asphaltic Concrete; Ninth International Ash use Symposium, Orlando FL, Jan. 22–25, 1991, American Coal Ash Association, Alexandria, VA, and Electric Power Research Institute, Palo Alto CA, pp. 23–1–23–11.

Baykal, G. and A. G. Doven, 1999, Lightweight Concrete Production Using Unsintered Fly Ash Pellet Aggregate; *Proc.,* Thirteenth International Symposium on Use and Management of Coal Combustion Products (CCPs), Orlando FL, Jan. 11–15, 1999, American Coal Ash Association, Alexandria, VA, pp. 3–1–343.

Hopkins, T.C., et al., "The Ohio Coal Development Office Coolside Waste Mangement Demonstration Project", Proceedings: Tenth International Ash Use Symposium, vol. 2: Ash Use R&D and Clean Coal By–Products, Electrical Power Research Institute, Jan. 1993, pp. 60–1 to 60–16.

Bland, A.E., "Effect of Curing Conditions on the Geotechnical and Geochemical Properties of CFBC Ashes", Proceedings of the 15th International Conference on Fluidized Bed Combustion, May 1999, Savannah, Georgia, 42 pages.

US Application, entitled "System for Producing Manufactured Materials From Coal Combustion Ash", filed Jul. 20, 1999, S/N 09/358,298, now issued as United States Patent No. 6,334,895.

US Application, entitled "Method of Producing a Coal Combustion Ash Composition", filed Dec. 28, 2001, S/N 10/034,361, which is a divisional of S/N 09/358,298.

* cited by examiner

STABLE CONSOLIDATED COMBUSTION ASH MATERIAL

This application is a division of U.S. application Ser. No. 10/034,361, filed Dec. 28, 2001, now issued as U.S. Pat. No. 6,517,631, which is a division of U.S. application Ser. No. 09/358,298, flied Jul. 20, 1999, now issued as U.S. Pat. No. 6,334,895, which claims the benefit of U.S. Provisional Patent Application No. 60/093,480, filed Jul. 20, 1998, each hereby incorporated by reference.

This application claims the benefit of U.S. Provisional Application No. 60/093,480 filed on Jul. 20, 1998 hereby incorporated by reference.

BACKGROUND OF THE INVENTION

The invention relates to a system for the treatment of ashes or residues from the combustion of carbonaceous fuels, such as coal. The invention discloses both methods and apparatus to control various physical and chemical characteristics of combustion ash as they relate to cold bonding processes, and as they relate to the cured consolidated materials which result from these processes. Specifically, this invention relates to cured consolidated combustion ash materials which have been standardized for use as normal weight and light weight aggregate for use in structural and landfill applications.

The combustion of carbonaceous fuels for the production of electricity or process steam by the utility and industrial sectors is a major generator of combustion ash. Combustion technologies such as fluidized bed combustion (FBC) and pressurized fluid bed combustion (PFBC) are widely implemented. Apprehension about pollution from the smoke stack industries and utilities has led to the implementation of clean coal technologies that addresses flue gas contaminants, not only for particulate, but also gaseous emission, such as sulfur oxides. These flue gas desulfurization (FGD) technologies are widespread and cover a range of techniques including wet scrubbers or wet FGD; dry scrubber FGD (i.e., spray driers); sorbent injection technologies; and fluidized bed combustion (FBC) technologies each of which produce a particular type of ash as a by-product.

The development of re-use technologies for each of these ashes, as well as those that result from the combustion of carbonaceous fuels without FGD technologies, has been slow. The obstacles are both technical, as well as regulatory and legislative. One of the prominent technical issues is the inability to produce ash-based products which have certain required engineering properties or meet particular standards in the industry.

There are a number of ashes, for example FBC ashes, which contain large amounts of free lime and other oxides, such as those of magnesium, iron, sodium and potassium, which heat and expand upon combination with water. These exothermic and expansive hydration reactions can be detrimental to the dimensional stability of the conditioned, consolidated, or compacted ash in either landfill disposal or in other re-use applications. FBC and FGD combustion ashes are examples of ashes which tend to exhibit expansion sufficient to limit their options for use and often cause difficulty in the construction of stable landfills as discussed in "Ash Management Options For AFBC", A. E. Bland and C. E. Jones which is hereby incorporated by reference. An approach to dealing with the problem of expansion in oxide rich combustion ash is disclosed by U.S. Pat. Nos. 5,364,572; 5,100,473; 4,250,134; 4,344,796 and by "A New Approach To Hydration Of FBC Residues" by J. Blodin and E. J. Anthony. Each teaches that all the free lime or other oxides must be initially slaked or nearly completely converted to a non-expansive hydrate prior to further processing steps. However, several problems are associated with using sufficient water to slake or nearly completely convert oxides to the corresponding hydrates which relate to handling problems and reduced early strength development in the cured consolidated combustion ash materials.

Another primary concern related to the production of construction related materials from certain lime and sulfate containing ashes, such as FBC ashes, is the subsequent formation of the minerals such as calcium sulfo-aluminate hydrate (ettringite), calcium sulfate di-hydrate (gypsum), calcium silicate hydrates and calcium aluminate hydrates as disclosed in "Effect of Curing Conditions on the Geotechnical and Geochemical Properties of CFBC Ashes", Proceedings of the 15th International Conference on Fluidized Bed Combustion, A. Bland, 1999 which is hereby incorporated by reference. The slow formation of these compounds has been linked to the observed expansion in FBC and other ashes, poor strength development in consolidated combustion ash materials and with the disintegration of cured consolidated materials. As cured consolidated combustion ash materials age, the formation of such minerals may continue and subsequently a portion of the pore volume within the material. The deposition of these minerals in the pores of the cured consolidated combustion ash material, left unchecked, may ultimately create enough force to crack the cured material adjacent to the pore. These micro-cracks may lead to a substantial loss of strength and abrasion resistance in the cured consolidated combustion ash material. A number of researchers have shown the benefit of soluble silicate addition to ashes containing free lime, such as FBC ashes. For example, as disclosed by U.S. Pat. Nos. 5,002,611 and 5,152,837 which focus on the addition of other ashes having soluble silicates to FBC ash. The soluble silicates in the ash react with the free lime in the FBC ash and form calcium silicates preferentially to the compound ettringite. This approach, however, has at least two problems associated with it. First, it is applicable to only certain ashes, and secondly it is costly because it requires additional steps related to procuring fly ash with a suitable amount of soluble silicate and the additional steps of processing the fly ash with the FBC ash.

Another significant problem in the field is the increasing use of self cementing combustion ashes, such as FBC ash, which contain large amounts of free lime and other oxides to replace the use of costly cement and lime additives in external cold bonding processes as disclosed by U.S. Pat. Nos. 4,624,711; 5,512,837; and 5,766,338 to increase the strength of the cured consolidation combustion ash product. As the use of self cementing ashes in other processes has increased, there has been an increased and unresolved need for effective and economic processes for controlling the expansion in conditioned and consolidated combustion ash due to hydrate or mineral formation.

Another basic problem which exists with regard to processing FBC and other dry ash relates to the existing practice of combining the dry combustion ash, the water and other additives. Cured consolidation materials which result from existing apparatus and methods which combine dry combustion ash, water and other additives at low energy may not develop optimum strength, may have high permeability, or may also have increased amounts of expansion. The amount of energy used to combine these components can be quantified with reference to "Standard Method For Mechanical Mixing Of Hydraulic Cement Pastes and Mortars of Plastic Consistency", ASTM C305-82 which is hereby incorporated by reference. In actual practice, this standard has been used to quantify the amount of energy with which wet flue gas desulfurization sludge (FGD sludge) is processed as disclosed in U.S. Pat. No. 4,613,374. Blending FGD sludge in a pug mill for about 20 to about 40 seconds is a common commercial processing practice and has been equated to about eight seconds of mixing in a Hobart N-50 mixer set at speed level 1. U.S. Pat. Nos. 4,613,374 and 5,211,750 disclose that the manner of can be beneficial with regard to processing FGD sludge and perhaps other materials that have thixotropic properties. Materials, such as FBC and other dry ashes, are not thixotropic and yet an unexpected relationship exists with regard to how dry ash is combined with water and the enhancement of various characteristics of cured consolidated combustion ash materials.

Another problem related to combining combustion ash with water and other additives is the ability to disperse the water throughout the combustion ash solids evenly at low water to solids ratios. However, water to combustion ash solids ratios which are above about 0.30 may not achieve the level of strength which may be achieved using identical types of combustion ash at water to combustion ash solids ratios less than about 0.30.

From the commercial manufacturing perspective there remain several significant problems to resolve.

First, with regard to the use of sintering processes, such as those disclosed by U.S. Pat. Nos. 3,765,920; 4,772,330; 5,342,442; and 5,669,969, the processes are becoming increasingly less economical because of the high costs of energy required to produce the products at temperatures of between about 1650 to about 2190 degrees Fahrenheit, and because of the high maintenance cost of the sintering and mechanical handling equipment. Also, the sintering processes do not appear promising because certain ashes that contain sulfate and sulfide from FBC and FGD technologies result in unacceptable $SO_x$ emissions during the sintering process.

Secondly, with respect to cold bond processes, many products prepared from combustion ash by such processes do not meet existing standards for use as normal weight aggregate which limits the price the market will pay for the materials and limits the markets in which the materials may be introduced. Normal weight aggregates must meet or exceed standards for road base and concrete aggregate use as set forth by ASTM C-33 which is hereby incorporated by reference. Adjusting the strength of and limiting the linear expansion of cured consolidated combustion ash material produced by existing cold bonding processes, such as those disclosed by U.S. Pat. Nos. 4,624,711; 5,152,837; 5,002,611 and as practiced by the Aardalite and Agglite process, requires the use of additives or additional processing steps which maybe prohibitively expensive. Additionally, cold bond processes have had limited success when applied to some types of combustion ash such as Class FBC, dry FGD, sorbet injection and others.

Specifically, with regard to the lightweight aggregate market, the use of specialty chemicals and additives may be justified because lightweight aggregate commands higher market prices relative to normal weight aggregate. However, even where lightweight additives achieve the required reduction in density there may be an associated decrease in the strength and durability of the lightweight material making it unacceptable for sale in the lightweight aggregate market. There is a need for a cold bonding process which produces a cured consolidated combustion ash material with sufficient strength such that a variety of additives may be introduced to reduce the density of the material and still meet the other applicable standards for lightweight material.

The invention discloses basic ideas and concepts which address each of the above mentioned problems relating to cured consolidation materials from cold bonding processes. As such, the invention provides apparatus and methods for the processing, consolidation and curing of combustion ash to form novel materials, as well as, for the improvement of various characteristics relating to cured combustion ash materials processed by existing technology.

SUMMARY OF THE INVENTION

Accordingly, it is the broad object of the present invention to provide a system for the production of cured consolidated combustion ash materials from cold bonding processes having novel or enhanced characteristics. One specific goal in this respect is to provide both methods and apparatus for a combustion ash cold bonding process to produce standardized normal weight aggregate for use in road base; for use in concrete having structural, masonry and insulation applications, and for use in light weight aggregate applications.

A second broad objective of the invention is to provide technology which may improve previously disclosed or presently used processes for cold bonding combustion ash. Such technology, may improve the products of existing technologies so as to be more readily accepted in existing markets, or may allow the improved products to be introduced into new markets, or simply make the existing technologies more economical.

A specific objective of the invention is to control the amount of expansion of combustion ashes which contain high levels of oxide when the combustion ash is combined with water. Controlling the molar volume expansion of oxides may decrease the linear expansion and improve the unconfined compressive strength of cured consolidated combustion ash materials. For certain applications, the hydrated combustion ash material may be intentionally designed to expand to fill a specific volume.

Another specific objective of the invention is to control the potential for the formation of minerals, such as enttringite and gypsum, in cured consolidated combustion ash materials. Controlling the potential for formation of such minerals and in turn the amount of deposition of such minerals in the pore volume of consolidated or cured combustion ash materials may allow manufacturers to predetermine and select certain attributes of the cured consolidated combustion ash material to meet certain specifications, or the requirements of various markets.

Another specific objective of the invention is to assess and control the manner of combining various types combustion ash with water and other additives. By controlling the manner of combining the combustion ash with water, various characteristics of the cured consolidated combustion ash product may be adjusted. A significant goal in this respect is to broaden the achievable range for some characteristics. Specifically this may allow for cured consolidated combustion ash materials having increased density and unconfined compressive strength, as well as decreased linear expansion. The manner of combining the combustion ash with the water may also result in a density, such as that achievable using a ASTM D-1557 compactive effort, using a lower standard of compactive effort, such as a ASTM D-698 compactive effort. Since density is related to characteristics such as strength development, permeability, LA abrasion resistance, soundness, and expansion, a simple and economic method to increase density with reduced effort would be highly valuable tool. A related goal is to reduce the water-combustion ash solids ratios of the combined material. Another related goal is to decrease the need for additives which are presently used to impart increased strength to cured consolidated combustion ash materials produced by existing processes. Similarly, another goal is to allow for the use of a wider variety of combustion ashes in the production normal weight and lightweight aggregates.

Another specific objective of the invention is to increase the strength of cured consolidated combustion ash material so as to compensate for the decrease in strength attributed to the incorporation of light weight filler materials. A specific goal with respect to increasing the strength is to identify additives which have been shown to be beneficial in enhancing strength development of combustion ash—water combination materials. Another specific goal is to identify novel fillers which produce bubbles within the combination material prior to the time the combination material sets.

Yet another objective of the invention is to disclose apparatus and methods which allow for the use of or improvement in the processing of a wide variety of combustion ashes, examples include, fly ash which resulting from the combustion of fossil fuels which is entrained in flue gases and is then collected; bottom ash resulting from the combustion of fossil fuels that does not become entrained in the flue gases and is removed from the bottom of the combustor; bed ash resulting from the combustion of FBC, CFBC, or PFBC combustion of fossil fuel; Class C ash resulting from the combustion of low ranked coals, such as lignites and subbituminous coals, which meet the specifications of ASTM C-618 which is hereby incorporated by reference; off specification Class C combustion ash which result from the combustion of low ranked coals such as lignites and subbituminous coals, but which do not meet all the specifications of ASTM C-618; Class F ash resulting from the combustion of bituminous and anthracite coal which meets the specifications of ASTM 618; off specification Class F ash resulting from the combustion of anthracite and bituminous coals but which do not meet the specifications of ASTM 618; spray dryer ash produced from the spray driers used to clean the flue gases from the combustion of fossil fuels; sorbent injection ashes produced from the injection of a sorbent to capture gaseous sulfur and incinerator ash from the combustion of municipal waste or other ash types as they are identified or are developed. Still another objective of the invention is to make use of a variety of waste waters such as coal pile runoff produced by rain percolating through or running off coal piles which are required to be treated before discharge; cooling tower blowdown produced at power plants as a result of being associated with cooling towers and which must be treated prior to discharge; paper mill liquors or effluent produced in association with paper mills and which require treatment prior to discharge. Seawater and brackish water (seawater) associated with coastal influx of seawater may also be used.

Another objective of the invention to provide set retarding chemicals which retard the rate at which consolidated combustion ash material sets. These additives are critical to processing some types of self cementing combustion ash, and with respect to others allows certain techniques to be accomplished prior to the time the consolidated combustion ash materials set.

Specifically with regard to consolidated combustion ash material to be introduced into the market for normal weight aggregate, it is an objective of the invention to meet or exceed American Society for Testing Materials (ASTM) and American Association of State Highway Transportation Officials (AASHTO) specifications, which are hereby incorporated by reference.

ASTM and AASHTO specification relate to normal weight aggregate to be used in concrete (ASTM C-33 and AASHTO M-80 and M6); aggregate specifications for use in masonry grout (ASTM C-404); aggregate use in masonry mortar (ASTM C-144 and AASHTO M-45); aggregate specifications for use in highway construction, road and bridge construction and highway and airport base and subbase applications (ASTM D-448, ASTM D-2940 and AASHTO M 43); fine aggregate for bituminous paving mixtures (ASTM D-1073 and AASHTO M 29); specifications for mineral filler for bituminous paving materials (ASTM D-242 and AASHTO M 42); crushed aggregate for Macadam pavements (ASTM D-693); crushed stone, crushed slag, and gravel for single and multiple bituminous surface treatments (ASTM D-1139); material for soil aggregate subbase, base and surface courses (ASTM D-1241); and materials for aggregate and soil-aggregate subbase, base and surface courses (and AASHTO M 147).

With respect to lightweight aggregate for use in structural concrete, masonry units and insulating concrete, an objective of this invention is to meet or exceed ASTM and AASHTO specifications related to lightweight aggregate use in structural concrete (ASTM C-330 and AASHTO M-195), concrete masonry units (ASTM C-331), and in insulating concrete (ASTM C-332).

With respect to structural fill and landfill use, an objective of this invention is to meet or exceed AASHTO specifications for materials for embankments and subgrades (AASHTO M 57) and ASTM standards for ash use in structural fill applications. An objective of this invention is to produce a stable low expansion landfill with low permeability and adequate strength development.

With respect to producing expandable grouts, an objective of this invention is to meet or exceed any ASTM specifications for use of the material for filling mine voids (provisional standards being developed).

DETAILED DESCRIPTION OF THE PREFERRED EMBODIMENTS

As can be easily understood, the basic concepts of the present invention may be embodied in a variety of ways. The general process for the treatment of ashes or residues from the combustion of carbonaceous fuels is actually a series of processes involving agglomeration and compaction concepts coupled with novel chemical additives to result in aggregate properties. This general process is discussed first and then additional embodiments of the invention are discussed separately.

Figure 1:
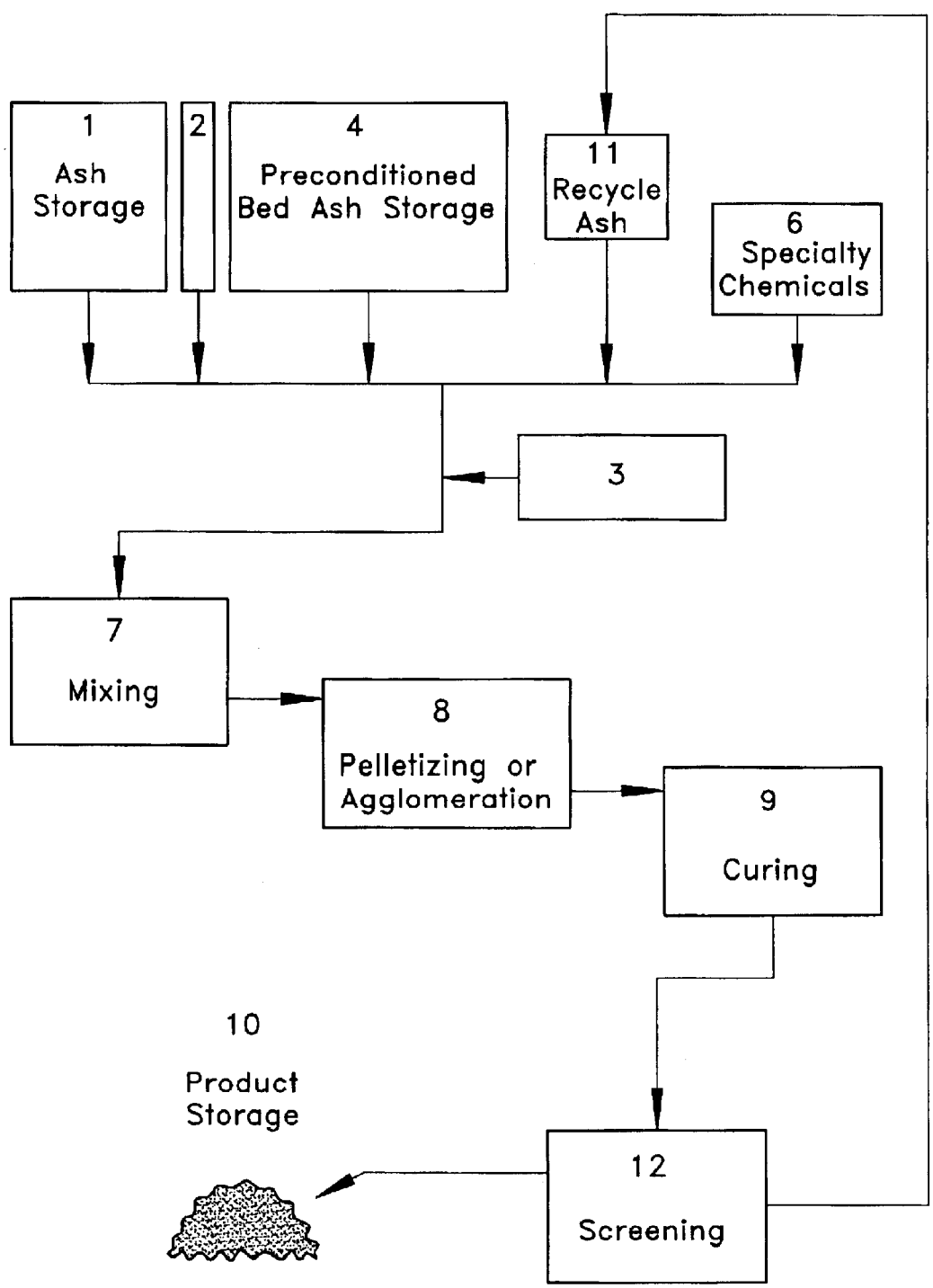
FIG. 1 is a diagram showing agglomeration/pelletization version of processing combustion ash to a cured consolidated material
Figure 2:
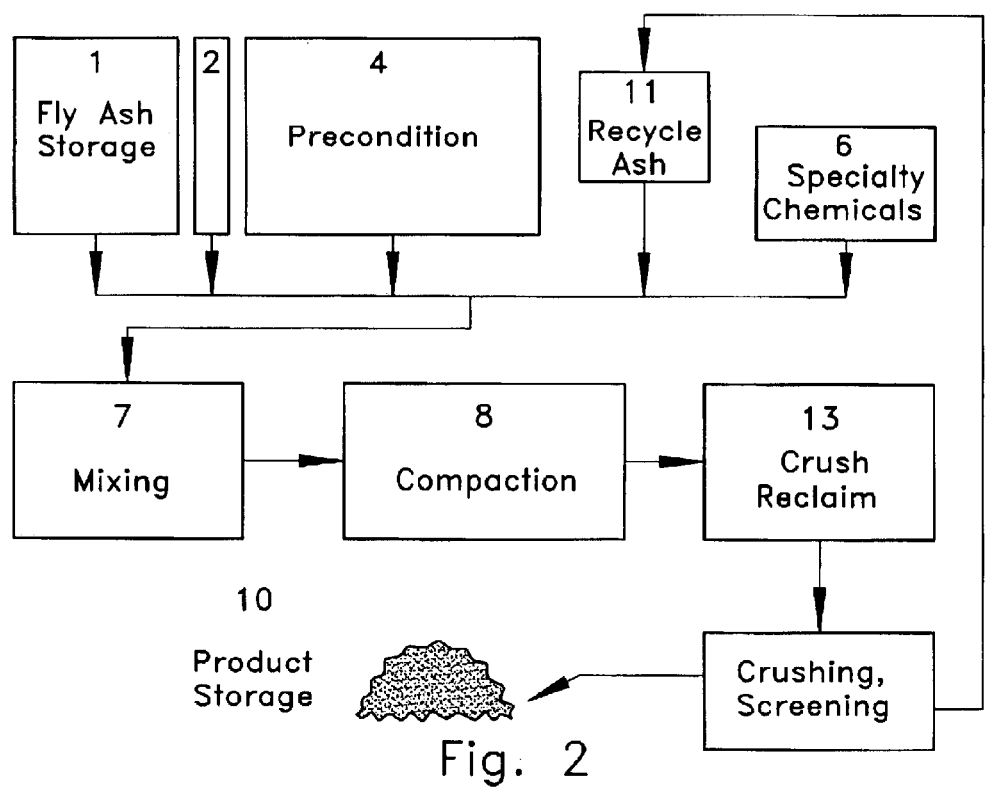
FIG. 2 is a diagram showing compaction/reclamation version of processing combustion ash to a cured consolidation material
Figure 3:
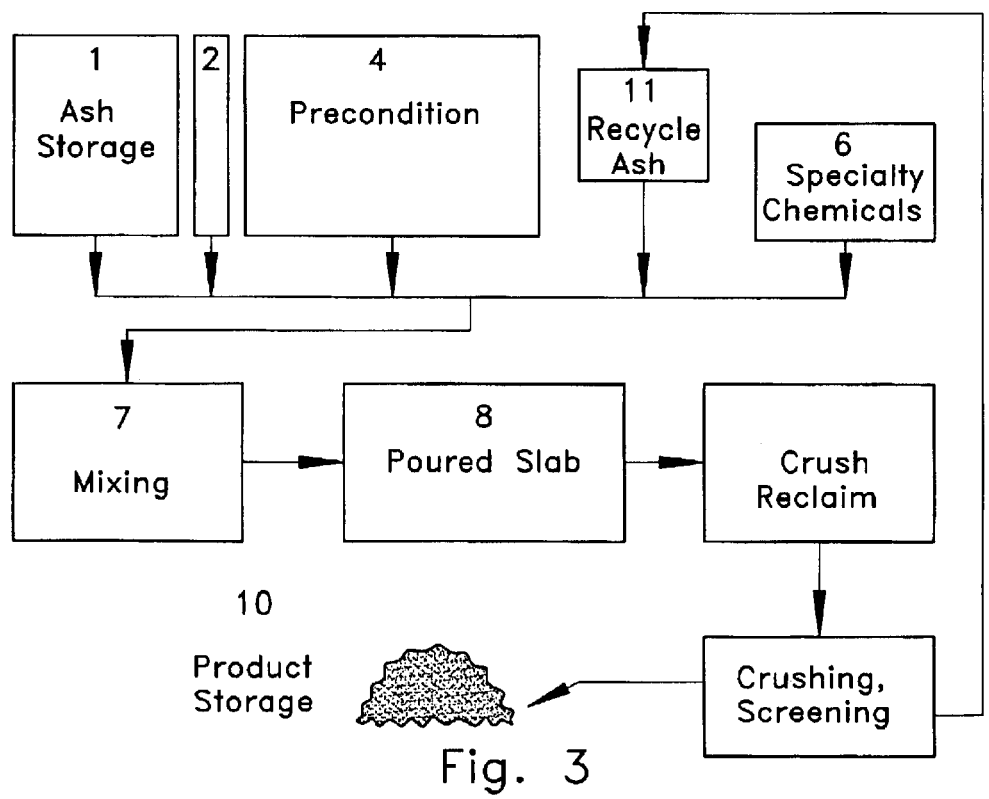
FIG. 3 is a diagram of the flowable ash-reclamation of processing combustion ash to a cured consolidation material

The treatment of combustion ash to produce aggregate involves the production of a cured consolidated or compacted product which has the properties of construction aggregate and may meet various ASTM and AASHTO specifications as mentioned above. Referring to FIGS. 1 through 3, combustion ash (1) may be selected from a wide variety of possible ashes as described above. Significantly, the instant invention may not only be used to process combustion ash which meets the specifications of ASTM C-618 but may also employ off specification ash which does not meet the C-618 standard or may even use municipal waste incinerator ash. The combustion ash may then be assessed (2) to determine the content of hydratable oxides and other compounds which are precursors to minerals which upon formation fill pores in the cured consolidated products and when in excess may cause expansion. These oxides and mineral precursors may be present separately or in combination in a particular combustion ash. The amounts of the combustion ash (1) and the amount of water(3) to be combined with the ash are then determined. The water may be derived from a variety of sources which may include all of the above mentioned sources and types of waste water. The determination of the appropriate amount of water may involve a first portion of water which is sufficient to pre-condition the combustion ash (4). The preconditioning process is further described in detail below. Additives (6) may be added to the combustion ash and water to control various chemical reactions and to alter various properties of the finished cured consolidated combustion ash material. These chemical reactions involve the conversion of oxides to hydroxides and the conversion of soluble compounds such as sulfates, alumina, and silicates and other compounds such as calcium silicate, calcium aluminate, or calcium sulfo-aluminate to minerals. When these chemical reactions are properly controlled the resulting hydroxides and minerals, individually or collectively, may enhance various properties of the cured consolidated combination material as described in detail below. The amounts of the combustion ash, of the water, and of the additives are subsequently combined (7). The manner of combining the combustion ash, water, and additives may be of substantial importance are addressed in detail below. The combination combustion ash material may then be consolidated (8) by any of three basic processes concepts and a number of variations on each concept. The three concepts include agglomeration or pelletization processes as shown in FIG. 1, mechanical compaction-reclamation processes as shown in FIG. 2, or flowable ash-reclamation processes as shown in FIG. 3. Agglomeration is a general term for the process of enlarging the particle size through such processes as pelletization, extrusion, and briquetting. With respect to agglomeration or pelletization, the combination material may be transferred to a pelletizing pan where the ash is agglomerated into pellets of a range of sizes. The sized pellets (12) are cured (9) to create hardened pellets that meet the ASTM specifications for aggregates or those of a particular market (10). The second option of consolidating the combustion ash-water combination material (or combination material) includes the compaction and reclaiming of the ash. The compaction-reclamation process has been used in with Class C ash, CFBC ash, and for ponded and reclaimed Class C and F ashes. In this process the combination material may be spread to a depth of 8 to 12 inches and may then be compacted to a high compaction. The compacted material is allowed to cure and harden at which point it may be reclaimed with a pavement reclaimer or other crushing equipment (13) and the product screened and the fines returned for reprocessing (11). The process is low in capital costs and involves equipment typically available at a power plant site. The third processing option for combination material may be the preparation of flowable mixtures that are poured into forms and subsequently reclaimed or crushed, as depicted in FIG. 3. This option is especially applicable for the lightweight aggregate production. For the production of lightweight material the development of voids is required which may be destroyed by high levels of compaction.

In summary, the general process for cold bonded technology is flexible and offers a range of processing options that can be specifically customized to the ashes being considered and the resultant cured consolidated combination material or aggregate product which is desired.

One embodiment of the invention deals with combustion ash (1) which contains large amounts of free lime (CaO) or other hydratable oxides such as magnesium. The hydration of the free lime or other hydratable oxides to hydroxide is bath exothermic and expansive. This reaction can be detrimental to the dimensional stability of the consolidated or compacted ash in (8) either landfill disposal or in re-use applications. To overcome this chemical-geotechnical problem, this invention discloses a combustion ash preconditioning step (4) moderates the amount of expansion encountered when the hydratable oxides present in the combustion ash are converted to hydroxides. In the instant preconditioning process, the amount of hydratable oxide is determined (2). From that determination, an amount of water is determined which is sufficient to convert substantially all but about five weight percent hydratable oxide to hydrated combustion ash. By calculating the non-hydrated oxide as a weight percent of the total weight of the hydrated combustion ash, the relative proportion of non-hydrated oxide to weight of combustion ash stays constant even when the amount of oxide in the combustion manifests a wide range of values. For example, for a 100 grain amount of ash (1) the process keeps the amount of non-hydrated oxide at a consistent amount of about 5 grams. This is true even if the amount of hydratable oxide is 50 grains in one particular 100 gram amount of combustion ash or 5 grams in another 100 gram amount of combustion ash. This is, of course, not the same approach as merely converting a percent of the hydratable oxide in the combustion ash to hydroxide in which case the weight of the non-hydrated oxide could be near zero or could be quite high depending on the content of hydratable oxide in a particular amount of combustion ash. Once the amount of water is determined it is combined with the combustion ash, the appropriate portion of oxide is converted to hydroxide in an exothermic reaction producing heat and some water evaporates. Upon cooling, the resulting combination material has an appropriate weight percent hydratable oxide relative to the total weight of the hydrated combustion ash. This relationship allows the addition of a second portion of water (3) to convert of the remaining hydratable oxide to hydroxide without substantially altering the physical dimensions of the cured consolidated combustion ash materials (10). Table 1 presents the results of testing of a CFBC ash preconditioned at different levels (although preconditioning would be applicable to any type of combustion ash). The strength and saturated expansion of the then resulting consolidated or compacted ash is shown for two different levels of mixing energy, which is discussed below.

The data clearly shows the improvement in strength and the reduction in the expansion of preconditioned consolidated or compacted combustion ash-water combinations. It is particularly notable that as the intensity of combining the ash with the water goes from an intensity which is typically used in the industry (low), as described above, to an intensity which the instant invention describes as high energy the amount of linear expansion substantially decreases. As such, the dimensional stability of the cured consolidated combustion ash materials is remarkably improved.

A remarkable and unexpected embodiment of the invention is the effect of mixing energy (7) on the strength development of combustion ash-water combinations. While the use of high energy or high energy mixing (7) may be beneficial to combining all types of combustion ash with water, particular types of ash show surprising and unexpected levels of increased strength development when mixed with high energy. The amount of energy used to combine combustion ash with water can be quantitated with reference to a ASTM "Standard Method For Mechanical Mixing Of Hydraulic Cement Pastes And Mortars of Plastic Consistency" which has been periodically updated. As mentioned above the standard has been used to equate common commercial processing practices, such as the use of a pug mill (about 20 to about 40 seconds of processing time in a pug mill has been equated to an the 1982 ASTM standard of about eight seconds in a Hobart N-50 mixer set at speed level 1). A particular embodiment of this invention combines 2000 grams of combustion ash with 200 to 800 grams of water in a Hobart mixer for about one minute at speed level 1 and then continues to mix the combination material for about above 2 minutes more at speed level 2 (which mixes at a faster rate than speed level (1)) which is an example of high energy mixing. It is notable that it is possible to mix dry combustion ash with water at this intensity and for these extended times because the combustion ash-water mixture does not manifest thixotropic properties or other processing problems which necessary preclude this level of high energy mixing. Low energy with regard to the tables and figures disclosed relates to an equivalent of a Hobart mixer operating with 2000 grams of combustion ash and between about 200 to about 800 grams of water combined at speed level 1 for one minute and at speed level 2 for two minutes.

Figure 4:
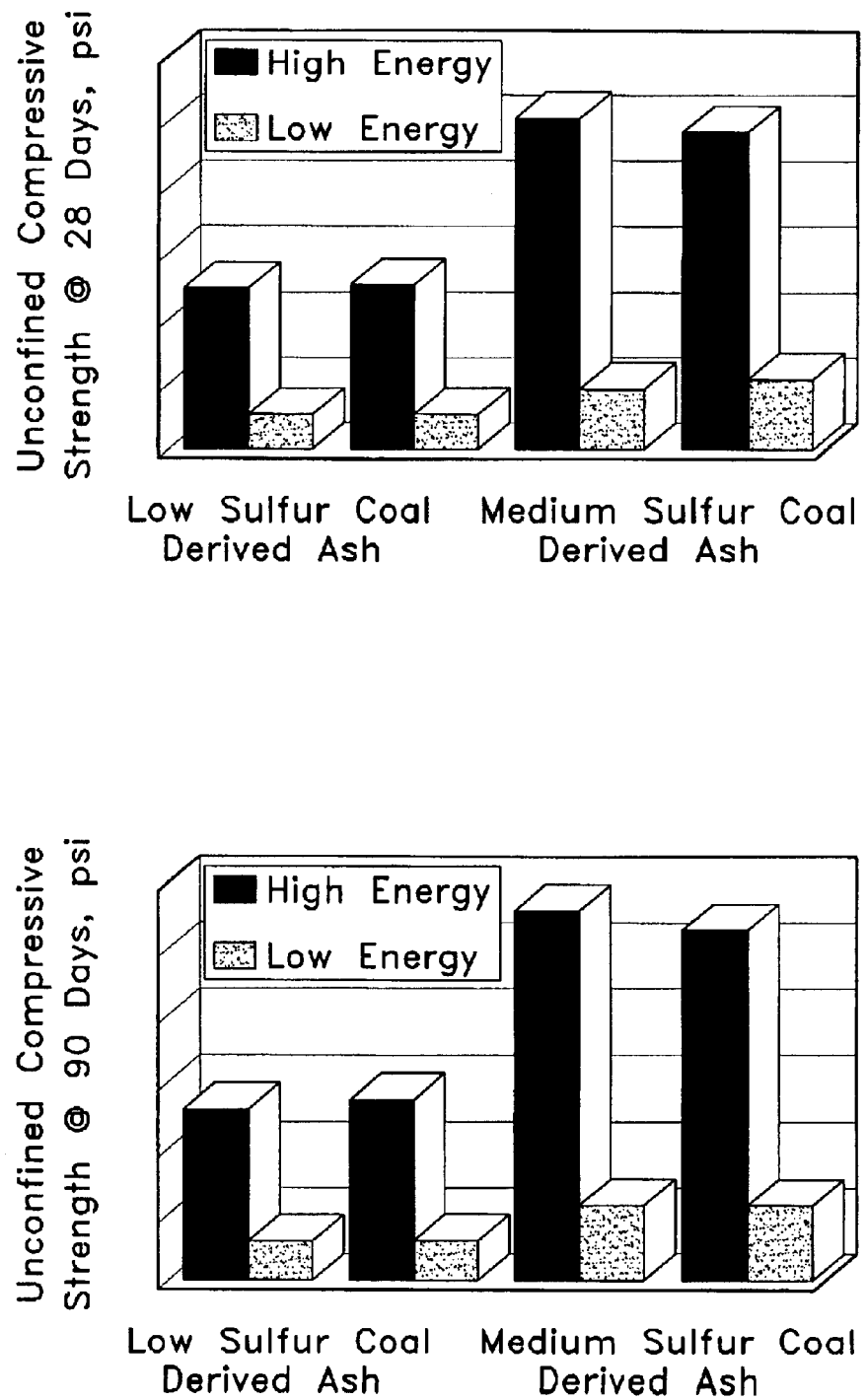
FIG. 4 is a diagram showing the effect of mixing energy on the strength development of combustion ash

As shown in by FIG. 4, a particular embodiment of high energy mixing of combustion ash with water dramatically improves unconfined compressive strength with regard to two types of FBC combustion ash. Although the specific

TABLE 1

Effect of Pre-Conditioning of the CFBC Bed Ash on the Geotechnical Properties of the Conditioned and Compacted Ash Blends

| Mixing Energy | High | High | High | Low | Low | Low |
|---|---|---|---|---|---|---|
| Bed Ash Pre-Conditioning (% Water) | 0% | 3% | 6% | 0% | 3% | 6% |
| Density (pcf) | 115.79 | 115.79 | 113.85 | 86.31 | 87.16 | 84.78 |
| Unconfined Compressive Strength (psi) | | | | | | |
| 7 days | 2075 | 2376 | 2109 | 612 | 574 | 610 |
| 90 days | 2905 | 3091 | 2778 | 678 | 686 | 686 |
| Linear Expansion* (%) | | | | | | |
| 7 days | 0.068 | 0.032 | 0.012 | 0.162 | 0.0423 | 0.111 |
| 90 days | 0.068 | 0.030 | 0.011 | 0.165 | 0.0433 | 0.111 |

*Linear expansion measured after curing in a saturated bath of the ash.

increase in strength may vary from one type of ash to the other, it has been noted that combining combustion ash with high energy enhances the unconfined compressive strength of consolidated combustion ash material made with a wide variety of ashes, such as FBC ash, PFBC ash, Class C ash, off specification Class C and off specification Class F ash, spray drier ash, and sorbent injection ash.

Figure 5:
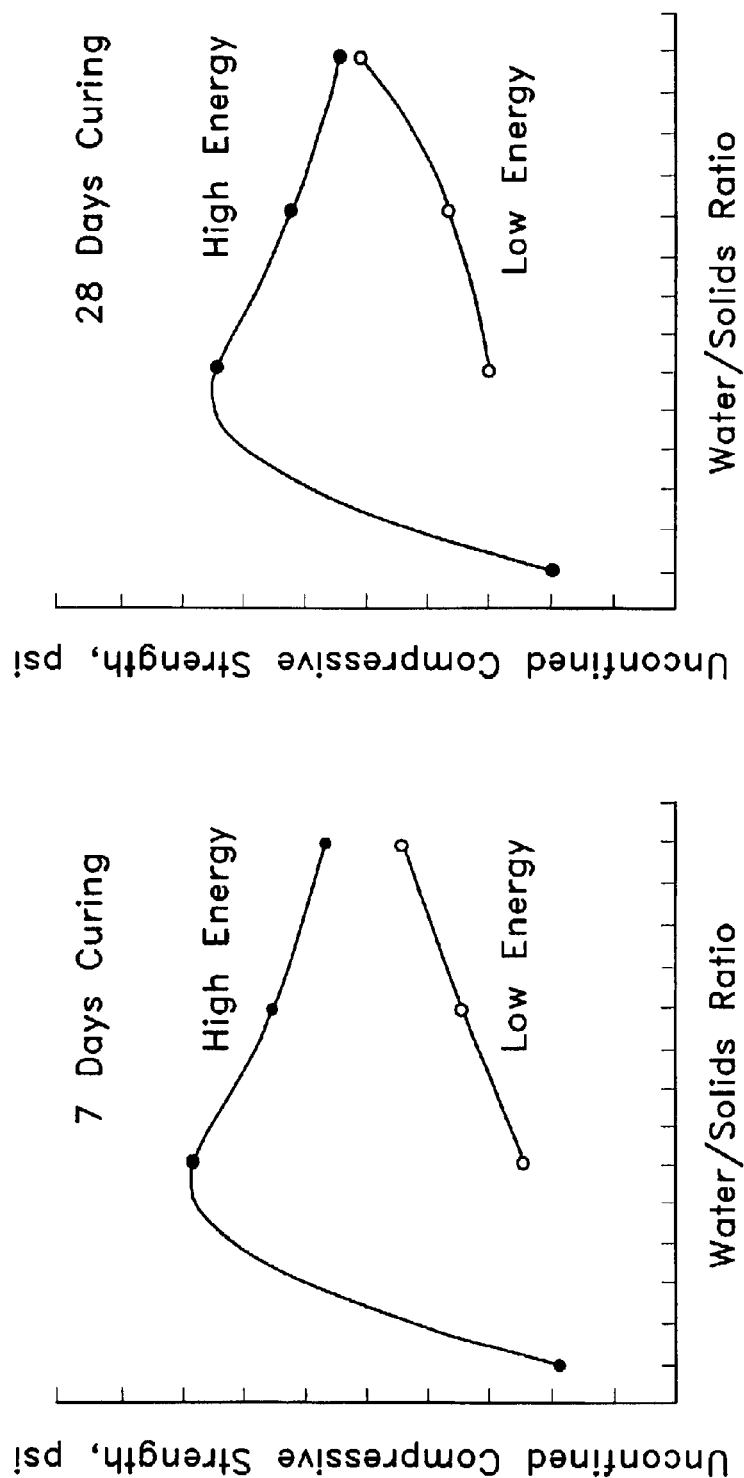
FIG. 5 is a graph showing the effect of mixing energy on the strength development as a function of the water/solids ratio

As shown by FIG. 5, the enhanced effect of high energy mixing on strength development covers a broad range of water to combustion ash solids ratios. As one would expect, the mixing energy has a larger effect at low water/solids ratios than at high water solids ratios. This is believed due the benefit of high energy mixing on the dispersion of the solids and water, thereby allowing an increase in the density and increasing strength development. Significantly, consolidated combustion ash material of commercial value with unconfined compressive strength above 1000 pounds per inch can be achieved at lower water to combustion ash solids ratios, such as 0.1–0.4, than with low energy mixing.

Figure 7:
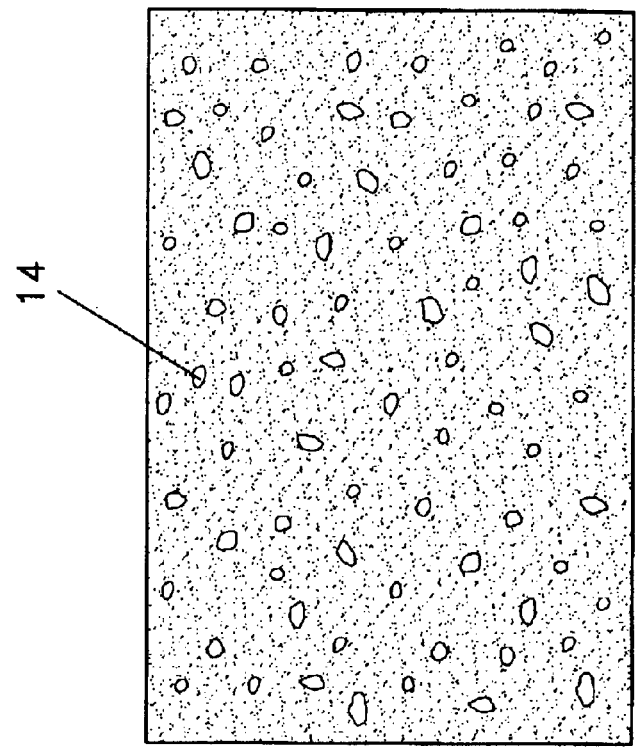
FIG. 7 is a diagram showing a pore size from high energy mixing
Figure 6:
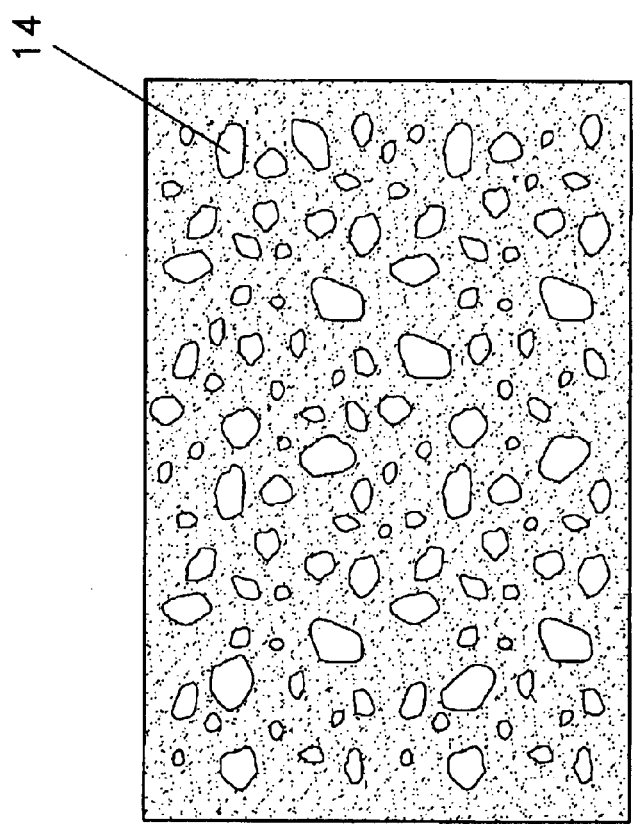
FIG. 6 is a diagram showing a pore size from low energy mixing

Also related to the use of high energy mixing and an increase in density of the combustion ash-water combination is the reduction in the size of the pore volume (14) in the consolidation material as shown by FIGS. 5, 6 and 7. Smaller high energy mixing pore sizes may enhance the density and unconfined compressive strength of consolidated combustion ash materials but may also be detrimental in consolidated materials prepared from ashes with higher soluble sulfates content, such as FBC ashes. These soluble compounds may collect in these smaller pores convert to minerals with greater molar volumes which can disrupt the matrix of cured consolidated material.

An important relationship exits between high energy mixing of combustion ash-water combinations and the compactive force required to achieve a desired density of consolidated combustion ash material as is disclosed by the data disclosed in Table 2.

TABLE 2

Summary of Mixing Energy on the Moisture - Density Relationships for CFBC Ashes.

| | Low Energy Mixing | High Energy Mixing |
|---|---|---|
| ASTM D-698 Compactive Effort | | |
| Optimum Moisture, % | 34.33 | 30.64 |
| Max. Dry Density | 76.15 | 85.25 |
| ASTM D-1557 Compactive Effort | | |
| Optimum Moisture, % | 28.66 | 27.98 |
| Max. Dry Density | 83.91 | 87.02 |

Figure 8:
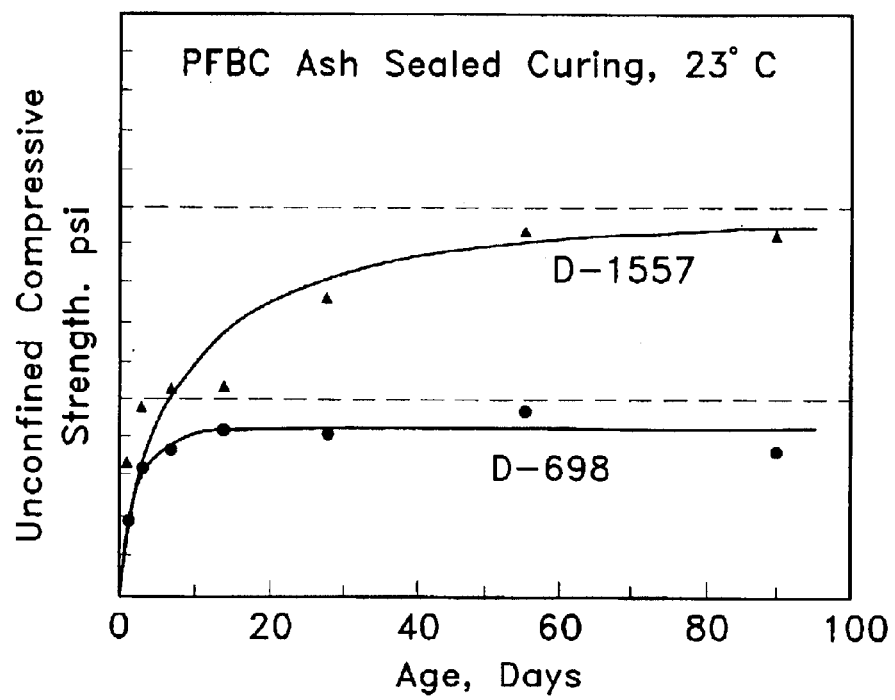
FIG. 8 is a graphic showing strength development of combustion ash-water combination compacted to ASTM D-698 and ASTM D-1557 moisture and densities

When high energy mixing is used to combine combustion ash and water, a maximum dry density may be achieved using a ASTM D-698 compactive effort which is comparable to that achieved using a ASTM D-1557 compactive effort on combustion ash-water combinations mixed at low energy. As shown by FIG. 8, achieving a ASTM D-1557 compactive effort with a ASTM D-698 compactive effort may also provide the associated strength development with less compactive effort. Using less compactive effort to obtain higher density products may also translate into the use of smaller and less expensive equipment to consolidate combustion ash water combinations.

Figure 9:
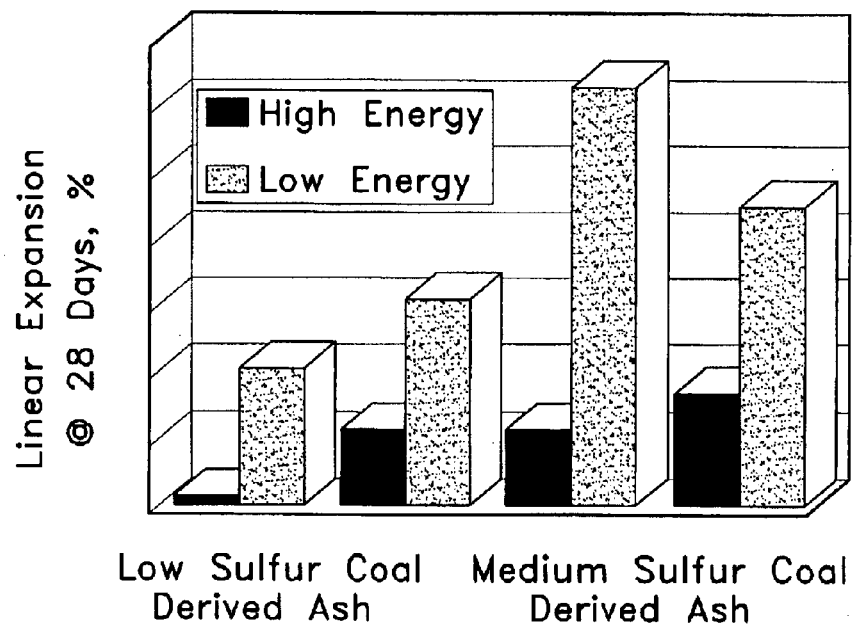
FIG. 9 is a graphic showing effect of mixing energy on the expansion characteristics of combustion ash

Another beneficial effect of mixing combustion ash and water with high energy is enhanced dimensional stability of consolidated combustion ash-water combinations. As is shown by FIG. 9, the use of high energy mixing has a positive effect on the expansion characteristics of conditioned and compacted ashes, particularly CFBC ashes, which are known to exhibit high expansion and dimensional instability. The data confirms the fact that the use of high energy mixing for both low sulfur coal derived ashes and medium sulfur coal derived ashes is indeed effective in reducing expansion.

Figure 10:
FIG. 10 is a photograph showing mineral formation in a cured consolidated combustion ash material
Figure 11:
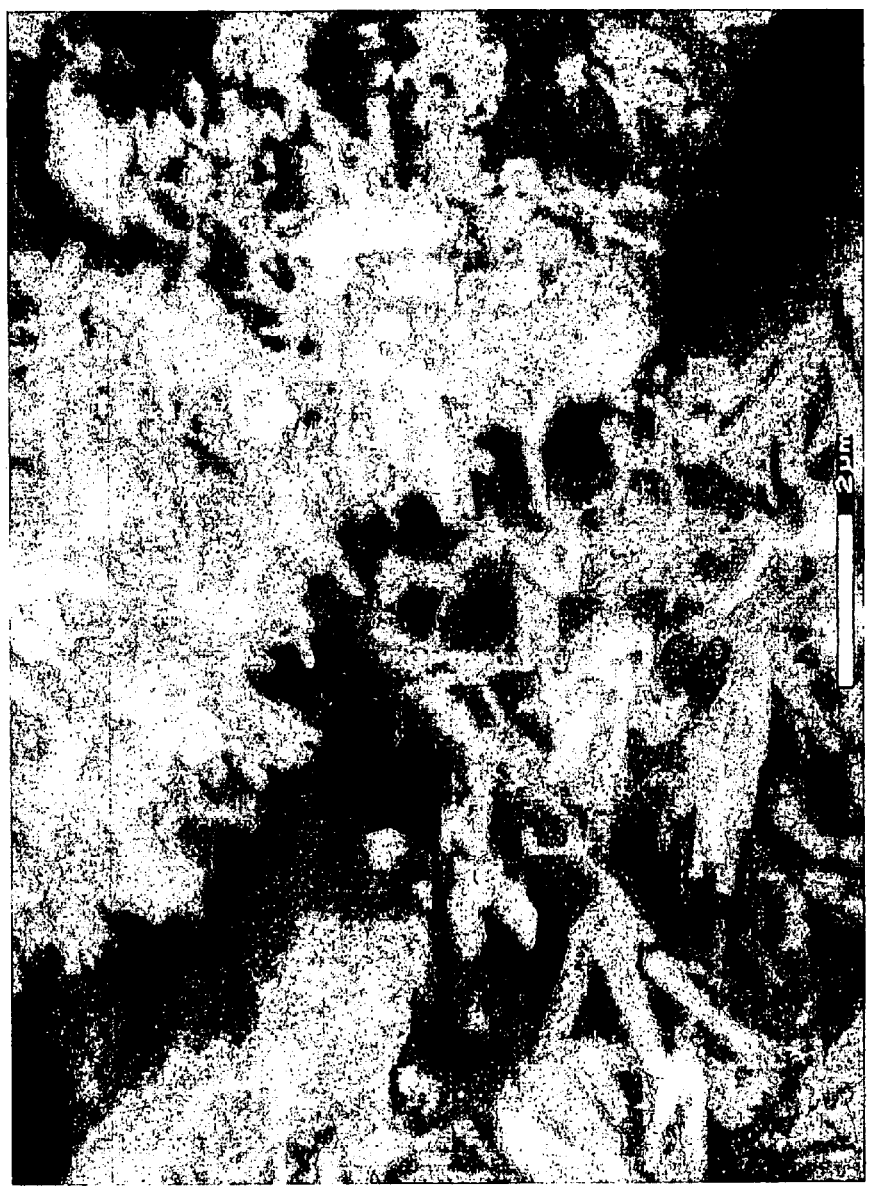
FIG. 11 is a photograph showing mineral formation in a cured consolidated combustion ash material
Figure 12:
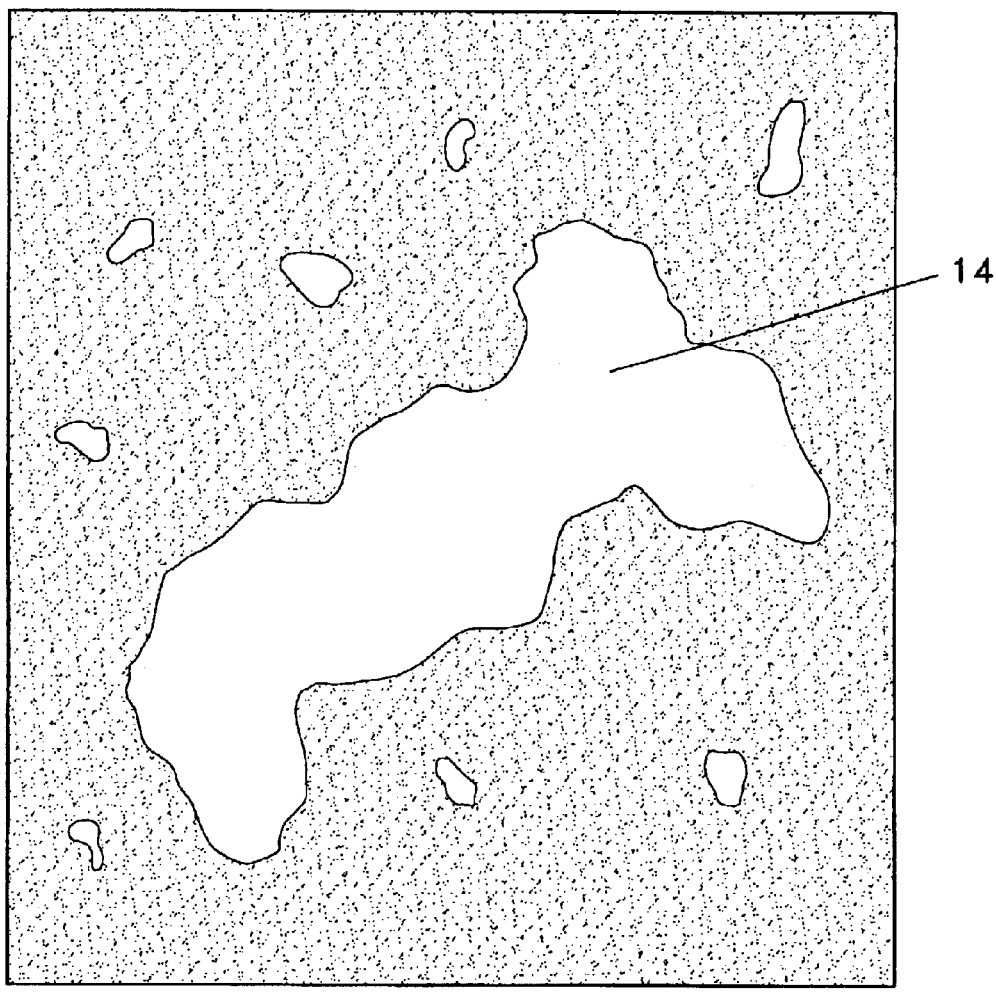
FIG. 12 is a diagram showing a pore volume filled with a mineral
Figure 13:
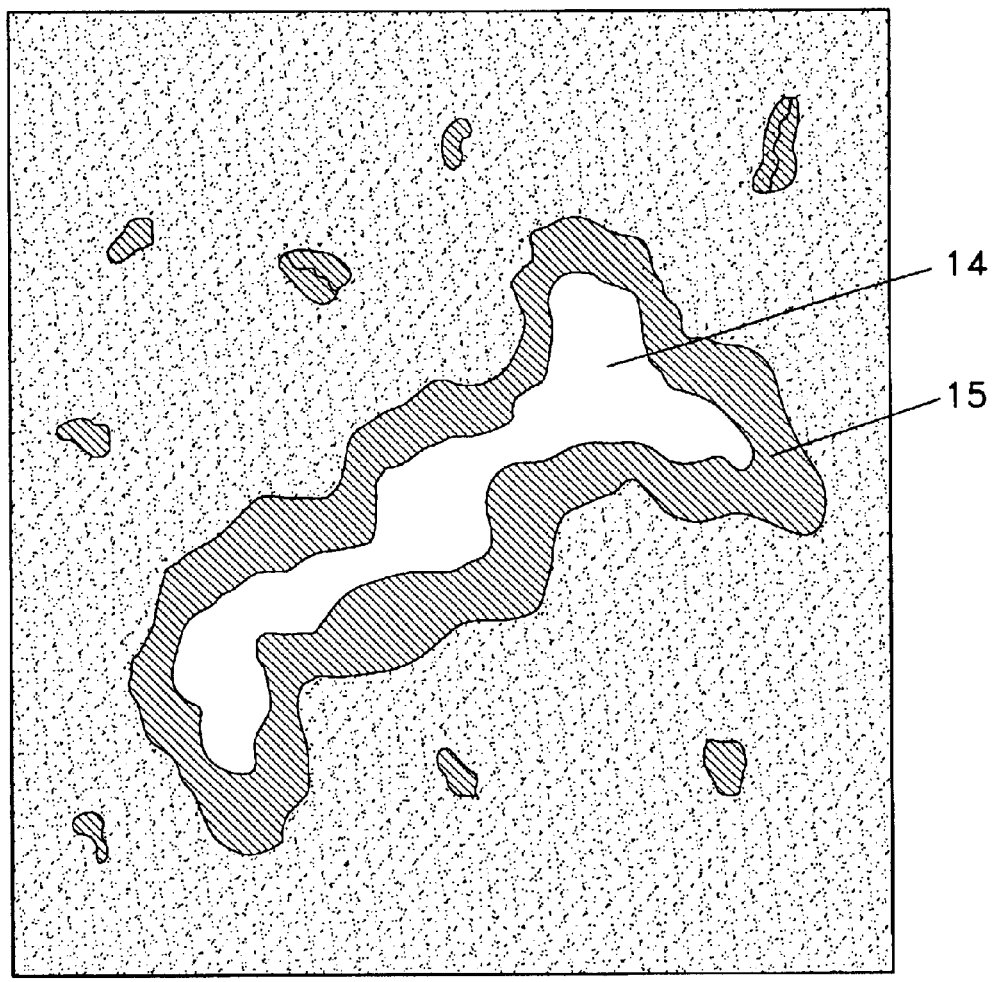
FIG. 13 is a diagram showing a pore volume having some volume filled with a mineral
Figure 14:
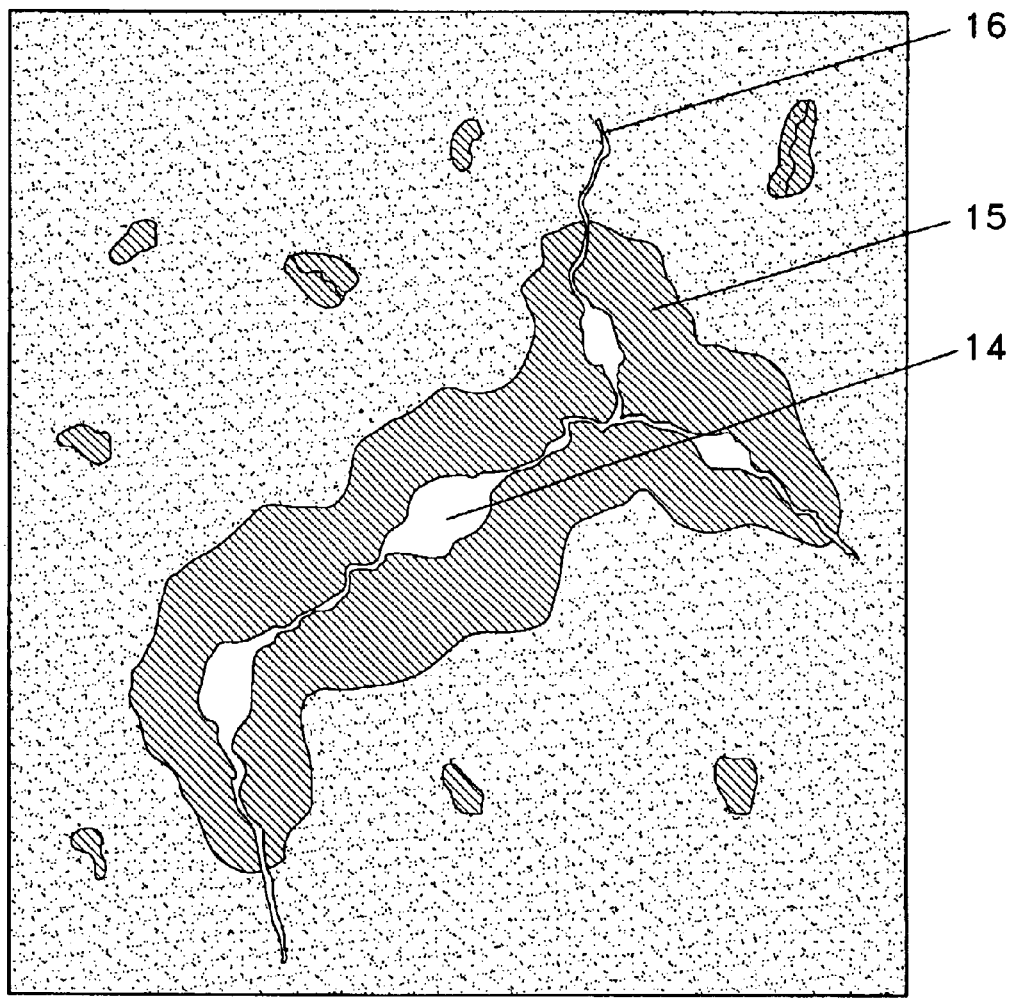
FIG. 14 is a diagram showing cracking of the adjacent combustion ash material

Another embodiment of the invention, addresses one of the primary concerns related to the production of construction related materials from certain ashes containing lime, soluble sulfates, calcium aluminate, and calcium sulfoaluminate (precursor pore filling compounds) which enter the pore volume of the cured consolidated combustion ash materials and subsequently form minerals such as ettringite, gypsum, calcium silicate hydrates and calcium aluminate hydrates (pore filling compound) as shown in the micrographs labeled FIG. 37 and FIG. 38. Ettringite has a larger molar volume than the precursor compounds from which it is derived forming needle like projections (15) as shown in FIG. 10 and FIG. 11. While gypsum has a molar volume which is more comparable to the precursor compounds from which it is formed. Depending on the type of pore filling compound and the portion of the pore volume which the pore filling compound occupies, expansive forces from the pore filling compounds on the adjacent cured consolidated combustion ash material may lead dimensional instability or cracking of the adjacent cured consolidation combustion ash material (16) as shown by FIGS. 12, 13, and 14.

The formation of ettringite, gypsum and other pore filling compounds is possible only under certain conditions, such as when free lime, soluble sulfates, and soluble alumina and other precursor pore filling compounds are available and when pH is greater than 10. U.S. Pat. Nos. 5,002,611 and 5,152,837 have shown the benefit of soluble silicate addition to CFBC ashes containing free lime. By the addition of other ashes having soluble silicates which react with the free lime in the CFBC ash the lime is converted preferentially to a less expansive mineral calcium silicate instead of the mineral ettringite. The instant invention by comparison deals with sequestration of the calcium ion by using inexpensive and readily available sources of soluble carbonates or $CO_2$ gas to react with the calcium ion to form calcium carbonate in preference to ettringite thereby rendering the consolidated combustion ash-water combination immune to ettringite formation. For clarity, the reactions are shown below:

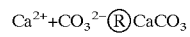

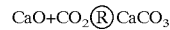

The calcium ion and lime are both precursor compounds essential to enttringite formation. By reacting these compounds with soluble carbonate or carbon dioxide a stoichiometric amount of calcium carbonate is produced. The remaining calcium, lime and precursor pore filling compounds react to form either gypsum or enttringite.

Figure 15:
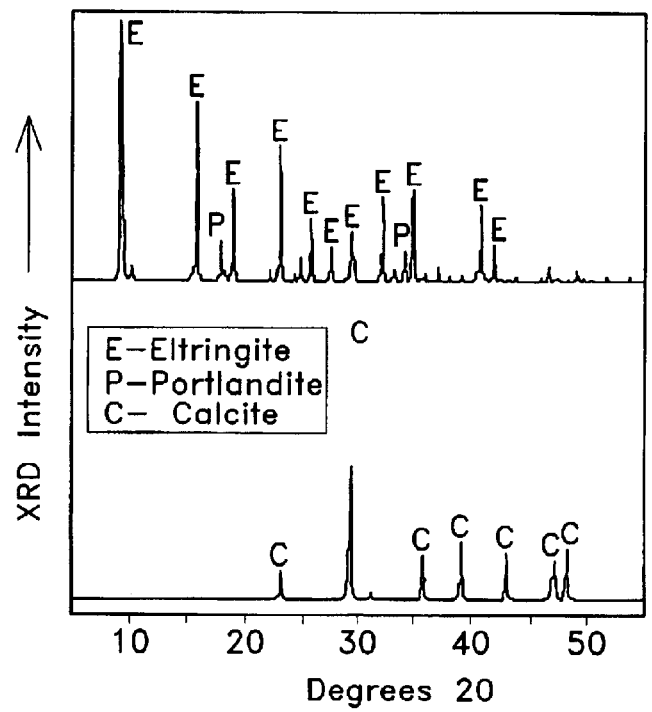
FIG. 15 is a X-ray diffractograms of untreated and soluble carbonate treated ettringite
Figure 16:
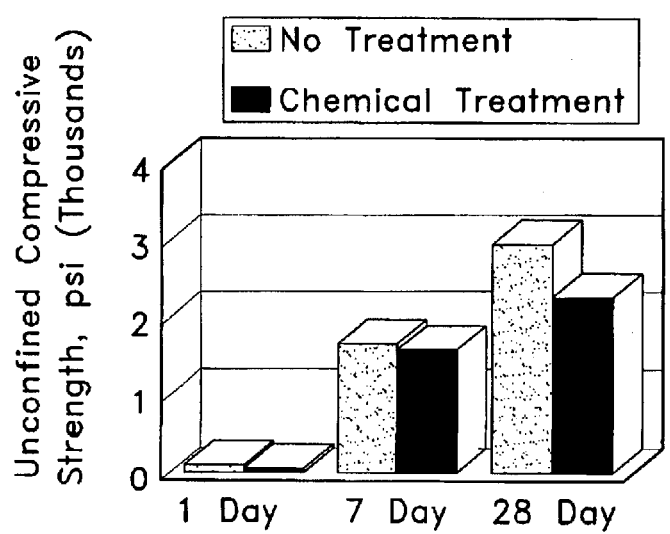
FIG. 16 is a graph showing the effect of soluble carbonate addition on the strength development of combustion ash
Figure 17:
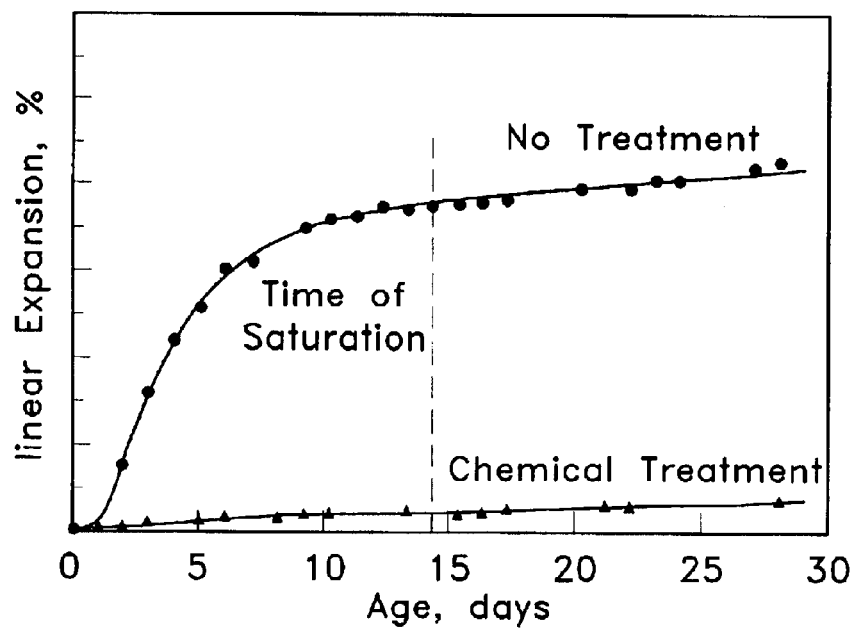
FIG. 17 is a graph showing the effect of soluble carbonate addition on expansion characteristics of combustion ash
Figure 18:
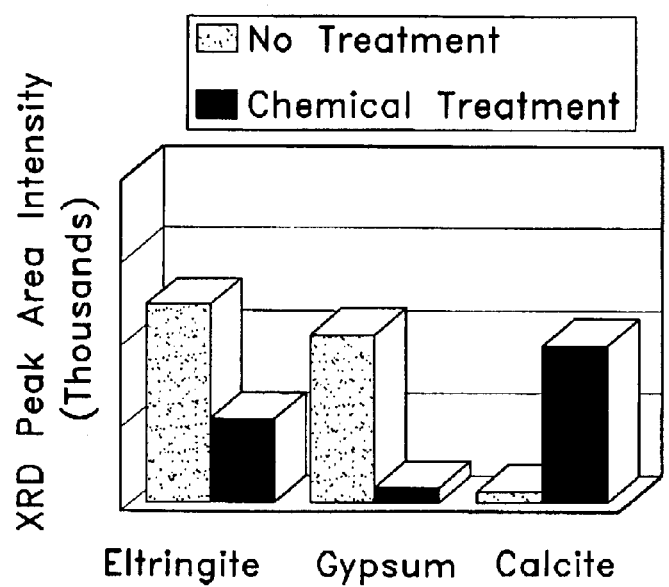
FIG. 18 is a graph showing the effect of soluble carbonate treatment on the reaction products formed in combustion ash

Tests have been conducted that confirm the viability of reaction. The effect of soluble carbonates on the stability of ettringite is confirmed in the XRD scans as shown in FIG. 15. The XRD scan of synthetically produced ettringite and the scan associated with the treatment of the ettringite with soluble sodium carbonate. It is clear that ettringite is not stable in conjunction with soluble carbonates, resulting in the formation of calcium carbonate(s) and amorphous aluminum hydroxide and soluble calcium sulfate. In addition to soluble carbonates or CO2 gases, Mg(OH)2 can also be used as a pore filling controlling compound to treat ettringite for expansion reduction purposes. There are two advantages to the instant invention. First, the cost of trona, a hydrous sodium or potassium carbonate, off-spec soluble carbonates, or CO2 is significantly less costly than obtaining ash containing soluble silicates or other soluble silicate compounds and these reactors can be shown. Secondly, the use of precursor pore filling controlling compounds such as soluble carbonates can be reacted stoichiometrically in a relatively short period of time with the free lime and thereby assuring the amount of non-pore filling compounds formed and thereby precisely controlling the amount of ettringite formed. As shown in FIG. 16, the use of soluble carbonates has little effect on strength development but a significant impact on expansion as shown in FIG. 17. FIG. 18 shows the hydration reaction products that are produced in a conditioned and compacted CFBC ash with and without soluble carbonate treatment. The amount of ettringite and gypsum formation is reduced with soluble carbonate treatment, while calcite concentrations increase with treatment.

The use of soluble carbonates is beneficial in that they improve the ASTM C-88 soundness characteristics of consolidated combustion ash materials. Table 3 presents the results of soluble carbonates on the soundness stability of aggregate made with CFBC ash. The data in Table 6 clearly shows the beneficial effect of soluble carbonate addition to the durability of treated CFBC ash. Without treatment, nearly all of the aggregate disintegrates under these test conditions. With treatment, the loss can be brought within the ASTM limits. ASTM sets limits of 15% for losses with the ASTM C-88 soundness test.

TABLE 3

Soundness Characteristics of Aggregate Treated with Soluble Carbonates.

|  | ASTM C-88 Soundness Test Loss (%) |
|---|---|
| No Treatment | 99.64 |
| Treatment - Level A | 17.98 |
| Treatment - Level B | 8.22 |
| Treatment - Level C | −0.70 |

The results of the soluble carbonate addition, specifically the ability to reduce the expansion characteristics of CFBC ash, is encouraging. However, the costs of soluble carbonates increases with increased free lime. As a result the costs increase from low-sulfur coal derived CFBC ashes to high sulfur coal derived ashes. Two alternatives to addition of soluble carbonates have been investigated. The first alternative is the replacement of the conditioning water with a carbonic acid or high levels of dissolved $CO_2$ in the liquid. This option has the advantage that the sodium or potassium associated with soluble carbonate additions would be eliminated. High dosages of soluble sodium associated with sodium carbonate may adversely effect the quality of leachate from the aggregate and the high sodium can cause problems with the use of the aggregate in certain applications, such as concrete and concrete products. The costs associated with this option have not yet been fully addressed.

Figure 19:
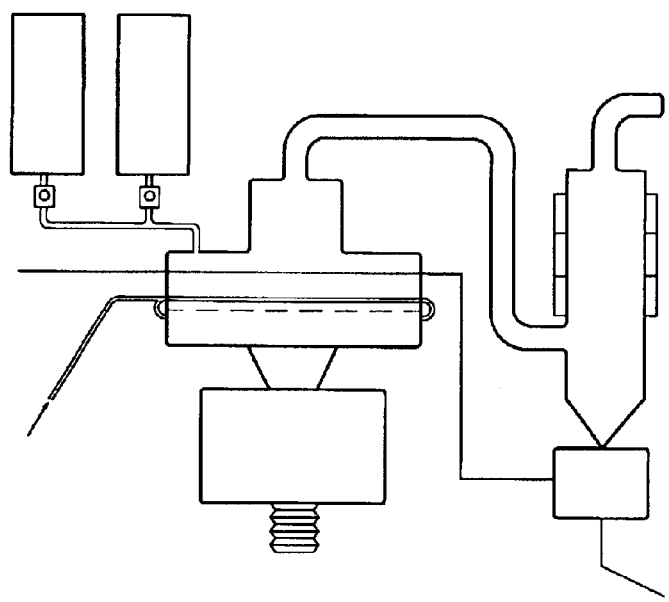
FIG. 19 is a diagram of a particularly embodiment for direct contracting of $CO_2$ rich gas with combustion ash during hydration process step

A second option involves the direct contacting of a high $CO_2$-rich gas with the ash. Conceptually, the contacting of the high lime ash with a gaseous $CO_2$ stream such as flue gas or enriched flue gas could be an option for ashes with high free lime contents in that direct gas contacting may be more economical. The contacting mechanism would most likely be integrated with the hydration or pre-conditioning step. The $CO_2$ would react with the CaO or $Ca(OH)_2$ in the ash and form a carbonate as in the case of soluble carbonate addition. One possible contacting configuration is presented in FIG. 19.

There may be an economical basis for capturing $CO_2$ from the flue gas and producing a $CO_2$ rich gas for carbonation of the ash, in that this could tend to reduce the size of the gas contacting equipment.

In summary, the significant embodiments of the invention which include a preconditioning of the combustion ash to effect the completion of the lime hydration reaction in a two step process with controlled weight percent amount of remaining lime to hydrated combustion ash which is converted in the second step has beneficial effects on strength and expansion properties. Clearly, the use of high energy mixing and processing can be beneficial to the resultant properties of the conditioned and compacted ash. The precise control of the conversion of precursor pore filling compounds to non-pore filling compounds to regulate the filling of the pores in the cured consolidated combustion ash materials may be beneficial for reducing expansion, controlling deterioration of the cured consolidated combination material, as well as enhancing the strength of the material.

Another embodiment of the invention addresses different curing conditions on the consolidated ash properties. Unique curing conditions may be required for each ash/chemical additive combination. A set of tests was conducted under 95% relative humidity at temperatures of 73° F. to 180° F. The results are presented in Table 4. The data indicate the value of elevated curing temperatures. As an example, for Class F fly ashes but not necessarily for the Class C fly ash. It is conceivable that the steam and pressure curing may allow for rapid strength development and reduced expansion.

TABLE 4

Summary of the Effect of Curing Temperature on Strength Properties of Cured Ashes*

|  | Class C Ash | Class F Ash | Class F Ash | Class F Ash |
|---|---|---|---|---|
| Retarder, % of water | 2% | — | — | — |
| Activator, % of solids | — | — | 5% | — |
| Water, % of solids | 13.0% | 16.5% | 16.5% | 28.6% |

TABLE 4-continued

Summary of the Effect of Curing Temperature on Strength Properties of Cured Ashes*

|  | Class C Ash | | Class F Ash | | Class F Ash | | Class F Ash | |
| --- | --- | --- | --- | --- | --- | --- | --- | --- |
|  | 73° F. | 180° F. | 73° F. | 180° F. | 73° F. | 180° F. | 73° F. | 180° F. |
| Curing Temperature | | | | | | | | |
| UCS**, psi @ 1 day | 5238 | 3818 | 136 | 304 | 256 | 1241 | 115 | 1221 |

*Cured at 73° F. and 180° F. and 95% relative humidity
**UCS - unconfined compressive strength Several embodiments of the invention involve the addition of specialty chemicals (6) to activate the hydration of the ash and the generation of hydration reaction phases that will contribute to strength; reduce or eliminate expansion that result in a reduction of the density of the hardened material as in the case of lightweight aggregate production. For discussion purposes, these additives can be grouped by the function they are to provide to the aggregate.

Many ashes from coal combustion processes set and harden either too fast or too slow for ease of handling or processing. For example, many of the Class C ashes have a tendency to flash set when exposed to water. This flash setting was noted for Class C fly ash. Flash setting occurred within five minutes. As a result, retarders were needed to enhance the workability of the water/ash mixture. Several such retarders have been identified. The test results using one of these retarders with the ash class C are presented in Table 5. The data show the benefit of retarder on the strength development of this Class C fly ash.

TABLE 5

Summary of the Effect of Retarders on Strength Properties of Cured Ashes*

|  | Class Ash | | | Class F Ash | | Spray Drier Ash | |
| --- | --- | --- | --- | --- | --- | --- | --- |
| Na Borate, % of water | 0% | 1% | 2% | — | — | — | — |
| Lime, % of solids | — | — | — | 0% | 5% | 0% | 5% |
| Water, % of solids | 13.0% | 13.0% | 13.0% | 16.5% | 16.5% | 28.6% | 28.6% |
| UCS**, psi @ 1 day | nd | 4446 | 5238 | 136 | 256 | 115 | 99 | nd - not determined
*Cured at 73° F. and 95% relative humidity
**UCS - Unconfined compressive strength Some ashes, on the other hand, are very slow to develop strength and, as such, require extended curing times. Previous testing with coal combustion ashes has indicated that there are certain activators that can be used to accelerate the strength development of these ashes. Not all accelerators or activators are suitable for all ashes. The test results using one of these activators with the class F fly ash and spray dryer ash are presented in Table 4. For example, data shows that the activator (lime) was beneficial to strength development for the Class F ash, but not necessarily for the spray dryer ash. It has been shown that certain lithium compounds may effective in activating certain Class C ashes that contain high levels of calcium aluminate. This area appears promising, but has yet to be explored in depth.

Figure 20:
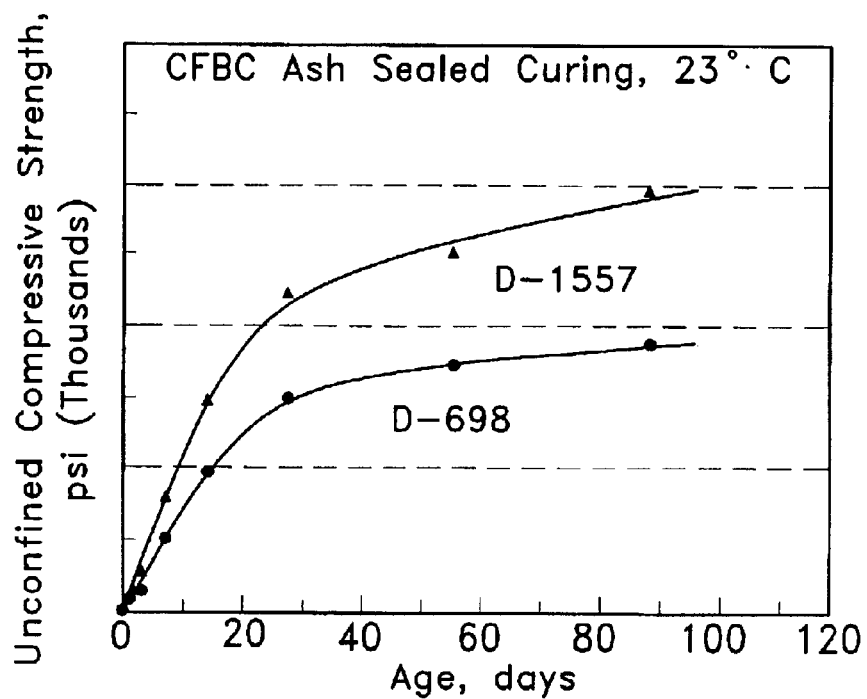
FIG. 20 is a graph showing the effect of compative effort on unconfined compressive strength

Strength development of ashes is a complex set of physical conditions and reaction chemistry. The physical conditions of the ash, such as density, directly impacts the strength development. FIG. 20 shows the effect of compactive effort and optimum moisture content of ash compacted according to ASTM D-698 and ASTM D-1557. ASTM D-698 employs approximately 40% of the compactive effort that is employed in ASTM D-1557. The higher the density, the higher the strength development.

Strength development of ashes used in the aggregate process is also dependent on the specific reaction chemistry of the individual type of ash. The type of ash determines the suite of activator and strength development additives that are required for the aggregate process. For Class F ashes, there is no self cementation that occurs and the addition of a binding agent is necessary for strength development. Additives such as Portland cement, self cementing ashes, and lime can be used to trigger the pozzolanic reactions. For Class C ashes which have self cementing character, additives such as Portland cement may be needed to enhance the strength development. For CFBC ashes which also show self cementing characteristics, it may be necessary to add chemicals such as soluble silicates and/or aluminates to enhance the strength development, in addition to Portland cements or cementitious ashes. The addition of lime has been shown to be needed for CFBC ashes that are low in free lime such as PFBC ashes and ashes from the combustion of low-sulfur coals. Examples of chemicals used by to process combustion ash are the aluminum sulfate, sodium silicates and even high sulfate resistant Portland cements.

Figure 21:
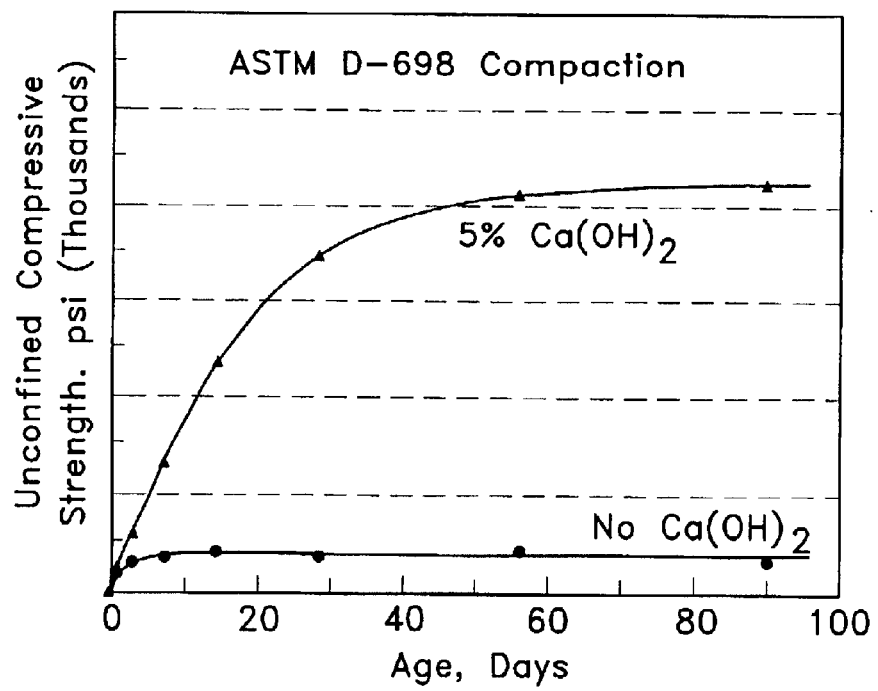
FIG. 21 is a graph showing the effect of lime addition on strength development of PFBC ashes

An example of the benefit of additives, such as lime, on the strength development of these ashes is presented in Table 6 and FIG. 21. It can be seen that the addition of lime effects the early strength and set times. This has implications for the curing requirements of the aggregate product in that it may be possible to significantly reduce the curing time through the use of certain strength development additives.

TABLE 6

Results of Testing of the
Effect of Lime Addition on Strength Development of
Class F and C Ashes

Figure 22:
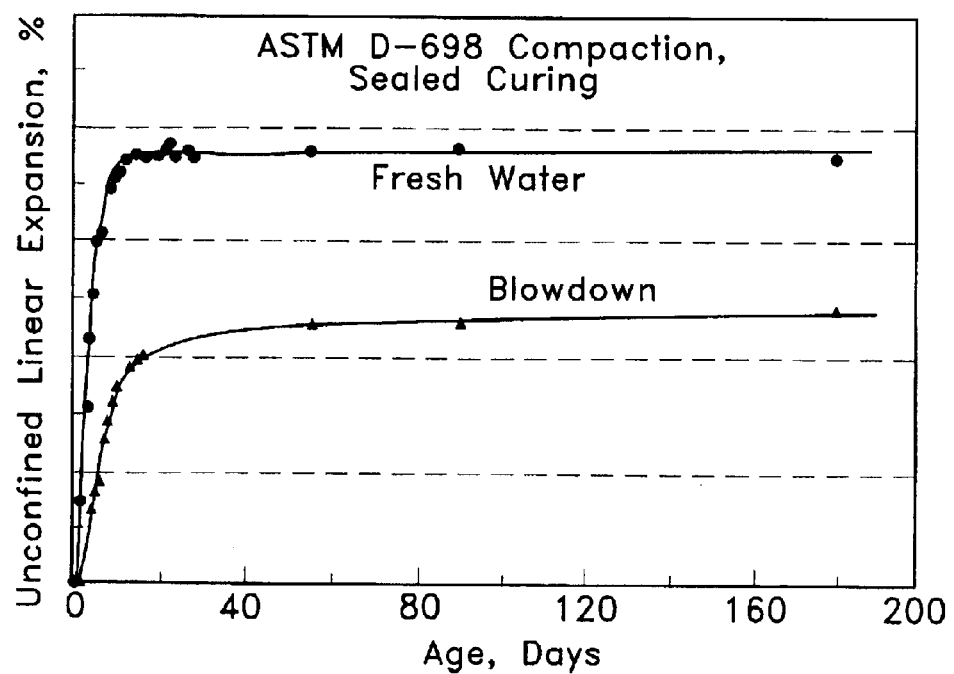
FIG. 22 is a graph showing a comparison of expansion characteristics of combustion ash using cooling tower blow-down and fresh water as conditioning water

|  | Class F | | Spray Drier | |
|---|---|---|---|---|
| Lime, % of solids | 0% | 5% | 0% | 5% |
| Water, % of solids | 16.5% | 16.5% | 28.6% | 28.6% |
| UCS**, psi @ 1 day | 304 | 1241 | 1343 | 1904 | nd - not determined
*Cured at 23° C. and 95% relative humidity
**UCS - Unconfined compressive strength In another embodiment of the invention waste water is used in replacement for pottable water. Power plants generate a number of liquid wastes that they are require to dispose on. Many of these wastes can be incorporated into the aggregate product. Testing was conducted using ash from CFBC facility and a cooling tower blowdown material from another power plant. The results of the tests are presented in Table 7 and FIG. 22. The material was easily incorporated into the combustion ash material without detrimental effects on the strength properties of the aggregate product. In fact, there is some evidence that it improved strength development and dimensional stability (expansion), particularly at extended saturated curing conditions.

The use of cooling tower blowdown in place of fresh water for ash conditioning can be economically attractive, while conserving fresh water (well) resources. The conditioning requirements for a 500 tpd ash plant can be approximately 150 tons per day (approximately 36,000 gallons/per day). Initial estimates indicate that ash conditioning can use the entire cooling tower blowdown from a power plant, thereby eliminating the cost of treatment and disposal of the waste material.

TABLE 7

Summary of Effect of Cooling
Tower Blowdown on Strength Development of CFBC Ash

|  | No Treatment | | Treated | |
|---|---|---|---|---|
| Curing Conditions | Sealed | Saturated @ 14 days | Sealed | Saturated @ 14 days |
| Unconfined Compressive Strength, psi | | | | |
| 1 day | 117 | | 103 | |
| 3 day | 963 | | 785 | |
| 7 day | 1773 | | 1398 | |
| 14 days | 2381 | | 2555 | |
| 15 days | | 2323 | | 2472 |
| 28 days | 3122 | 2882 | 3478 | 3042 |
| 42 days | | 2998 | | 3455 |
| 56 days | 3498 | | 3744 | |
| 70 days | | 3725 | | 3791 |
| 90 days | 4282 | | 3563 | |
| 104 days | | 3821 | | 4040 |

*UCS - Unconfined Compressive Strength

Yet another embodiment of the invention discloses the use of lightweight additives to reduce the density of the cured consolidated combustion ash material. The ability to produce a lightweight aggregate with the aggregate process has some definite economic advantages, because typically the lightweight aggregate market commands a higher price for the aggregate relative to normal weight aggregate. As a result, one can justify the use of specialty chemicals to produce lightweight aggregate.

The addition of materials to reduce the bulk density of the hardened ash mass is critical to the development of lightweight equivalents using the aggregate process. A number of additives have been investigated. The underlying concept employed in the selection of the lightweight additives is to either (1) incorporate a filler material with a light weight into the aggregate mixture or (2) incorporate chemicals that will generate gas bubbles in the aggregate mixture thereby reducing the overall weight of the final aggregate product.

Filler materials that have been evaluated are wood by-products and styrofoam pellets. Both of these materials are generally available and in many areas considered a waste, resulting in a cost to the generator for disposal. The wood waste by-products are of two types; (1) a coarse chip like material and (2) a saw dust. The saw dust appears to be more feasible in that it allows the reduction of density without the separation of the wood product from the ash binder, during crushing and sizing. The results of the density reduction associated with wood by-product addition and styrofoam addition is presented in Tables 8 and 9.

The use of fillers may be beneficial in that it allows the water content in the aggregate ash-water mixture to be low and thereby having higher strength. The data clearly shows the effectiveness of these two filler materials in decreasing the density of the ash/filler mixture. The amount of additive filler is dependent upon the amount of density reduction and the relative densities of the fillers.

TABLE 8

Summary of the Effect of Wood Waste Fillers on the Density of the Resultant
Conditioned and Compacted Synthetic aggregate Product

| Mix Proportions, pcy | No Additive | Fine Sawdust | Fine Sawdust | Fine Sawdust |
|---|---|---|---|---|
| FBC Fly Ash | 1742.9 | 730.7 | 1345.5 | 1436.9 |
| FBC Bed Ash* | 348.3 | 145.5 | 267.9 | 286.1 |
| Water | 744.1 | 1070.0 | 831.6 | 845.2 |
| Wood By-Product | — | 262.66 | 124.01 | 66.22 |
| Total | 2835.3 | 2208.9 | 2569.1 | 2634.4 |
| Proctor, pcf | 105.01 | | | |

TABLE 8-continued

Summary of the Effect of Wood Waste Fillers on the Density of the Resultant Conditioned and Compacted Synthetic aggregate Product

| Density, pcf | | | 81.81 | 95.15 | 97.57 |
|---|---|---|---|---|---|
| Density Reduction % | | 0.00% | 22.09% | 9.38% | 7.09% |

| Mix Proportions, pcy | No Additive | Saw Dust | Mix Proportions, pcy | No Additive | Saw Dust |
|---|---|---|---|---|---|
| Fly Ash | 2354 | 1549.3 | Spray Drier Fly Ash | 2201.6 | 1302.0 |
| Water | 659.2 | 593.5 | Water | 627.5 | 260.4 |
| Wood By-Product | — | 309.86 | Wood By-Products | — | 371.1 |
| NaBorate | — | 4.0 | | | |
| Total | 3013.5 | 2393.5 | Total | 2829.1 | 1933.5 |
| Proctor, pcf | 111.61 | | Proctor, pcf | 104.78 | |
| Density, pcf | | 91.71 | Density, pcf | | 71.61 |
| Density Reduction % | 0.00% | 17.83% | Density Reduction % | 0.00% | 31.07 |

*Hydrated at 6% moisture

TABLE 9

Summary of the Effect of Styrofoam Fillers on the Density of the Resultant Conditioned and Compacted Synthetic aggregate Product Using CFBC Ash

| Mix Proportions, pcy | No Additive | StyroFoam | StyroFoam | StyroFoam |
|---|---|---|---|---|
| FBC Fly Ash | 1742.9 | 1318.6 | 1225.8 | 1384.9 |
| FBC Bed Ash* | 348.3 | 263.6 | 245.0 | 276.8 |
| Water | 744.1 | 620.2 | 588.2 | 775.4 |
| StyroFoam | — | 10.55 | 7.84 | 4.98 |
| Total | 2835.3 | 2212.9 | 2066.9 | 2442.2 |
| Proctor, pcf | 105.01 | | | |
| Density, pcf | | 81.96 | 76.55 | 90.45 |
| Density Reduction % | 0.00% | 21.94% | 27.10% | 13.86% |

Styrofoam becomes flattened decreasing density reduction %
*Hydrated at 6% moisture The second general method of reducing the density of the aggregate material is to add chemicals that will generate gas bubbles in the product. A number of chemical additives have been investigated, including air entraining agents, foaming agents, and aluminum powder. The results of testing of commercially available air entraining agents, (AEA) are presented in Table 10.

Figure 23:
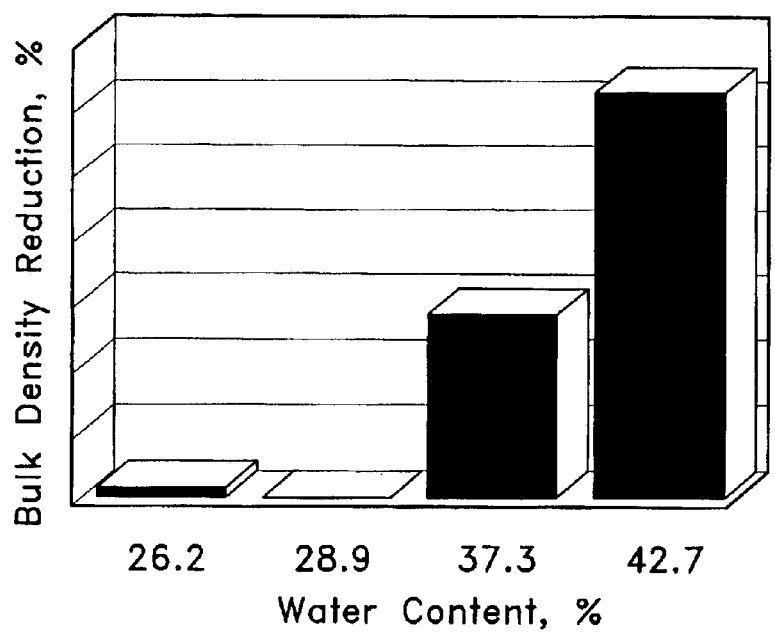
FIG. 23 is a graphic showing the effect of water content on the density of cured consolidated combustion ash using aluminum powder

These mixtures usually may be fluid in order for the reaction and the formation of air bubbles to evolve. Dryer mixes do not tend to form air bubbles. The relationship of water content and reduction in density of the mixes is presented in FIG. 23.

Figure 24:
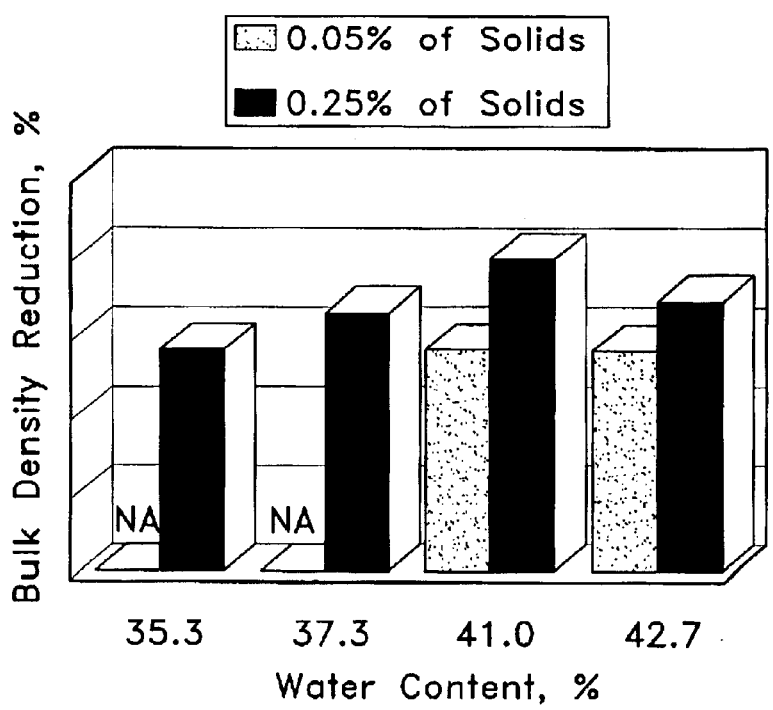
FIG. 24 is a graphic showing of the effect of percentage water content on the percentage reduction of density
Figure 25:
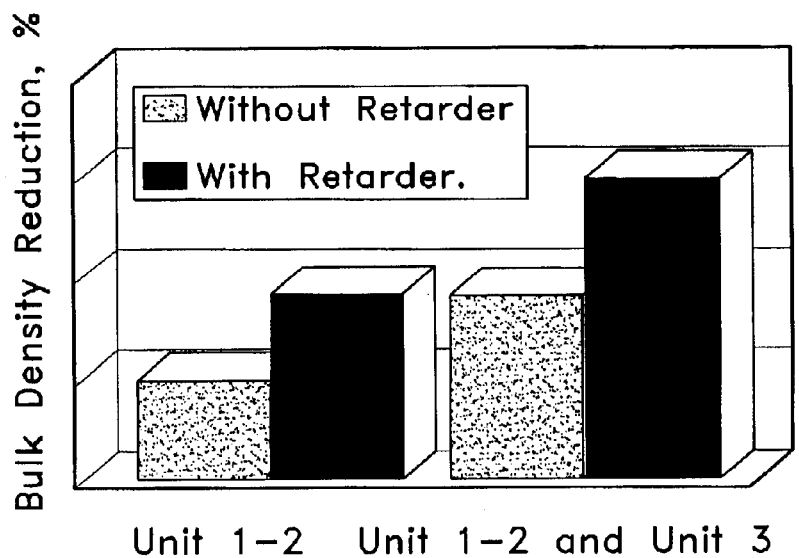
FIG. 25 is a graphic showing the effect of set retarder on the density of cured consolidated combustion ash using aluminum powder

Aluminum powder can also be used for CFBC ashes that contain free or hydrated lime or portlandite [$Ca(OH)_2$]. For ashes not containing free lime or portlandite such as Class C and Class F ashes, the combination of aluminum powder with lime can be employed. The reaction of the aluminum powder with hydrated lime and water results in the formation of gas and the expansion of the ash-water mixture. The effectiveness of the aluminum powder is dependent on the water content of the mix as seen in FIG. 24. It is important to note the need for a set retarder for effective bubble generation and density decrease for those ashes that show rapid set, such as Class C ash. This relationship is shown in FIG. 25.

Table 11 presents the results of testing using aluminum powder to reduce the density of CFBC and Class C and F spray dryer ashes. The use of aluminum powder at less than 1 lb per cu. yd. addition has different effectiveness for the different ashes. The reduction achieved at this dosage rate

TABLE 10

Summary of the Effect Addition on the Bulk Density Reduction of CFBC and Class F and C Spray Dryer Ash Synthetic aggregate Mixtures

| Mix Proportions, pcy | CFBC Ash | CFBC Ash | Mix Proportions, pcy | Class C pcy | Mix Proportions, pcy | Craig Station |
|---|---|---|---|---|---|---|
| FBC FA | 206.4 | 891.9 | Unit 1–2 FA | — | Silo B FA | — |
| FBC BA* | 412.0 | 594.6 | Unit 3 | 1490.9 | Silo C | 1493.5 |
| Lime | — | — | Lime | 59.6 | Lime | 149.3 |
| ABA | 0.25 | 0.15 | ABA | 0.15 | AEA | 0.15 |
| Water | 1845.4 | 1040.6 | Water*** | 596.4 | Water | 896.1 |
| Total | 2464.0 | 2527.2 | Total | 2147.0 | Total | 2539.08 |
| Proctor, pcf | 105.01 | 107.75 | Proctor, pcf | 111.61 | Proctor, pcf | 103.89 |
| Density, pcf | 91.26 | 93.60 | Density, pcf | 79.52 | Density, pcf | 94.04 |
| Density Reduction, % | 13.09 | 13.12 | Density Reduction, % | 28.75 | Density Reduction, % | 9.48 |

Figure 26:
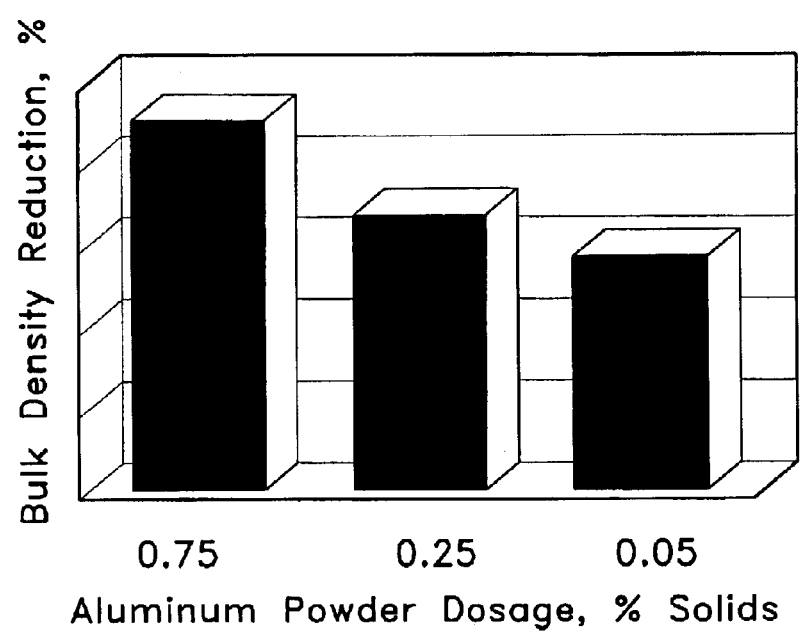
FIG. 26 is a graphic showing effect of aluminum powder dosage on the reduction of density of cured consolidated combustion ash

***Retarder Added results in density reductions of 8 to 28%. The effect of aluminum dosage on the percent reduction of density is presented in FIG. 26.

TABLE 11

Summary of the Effect of Al Powder Addition on the Bulk Density Reduction of CFBC and Class F and C Spray Dryer Synthetic aggregate Ashes

| Mix Proportions, pcy | CFBC Ash | CFBC Ash | Mix Proportions, pcy | Class C Spray Drier Ash | Mix Proportions, pcy | Class F Spray Drier Ash |
|---|---|---|---|---|---|---|
| FBC FA | 972.8 | 714.5 | Unit 1–2 FA | — | Silo B FA | — |
| FBC BA* | 194.4* | 476.3** | Unit 3 | 1430.4 | Silo C | 1521.2 |
| Lime | — | — | Lime | 57.2 | Lime | 152.1 |
| Al Powder | 0.58 | 0.60 | Al Powder | 0.72 | Al Powder | 0.76 |
| Water | 812.4 | 833.6 | Water*** | 858.2 | Water | 912.7 |
| Total | 1980.2 | 2025.0 | Total | 2346.6 | Total | 2586.87 |
| Proctor, pcf | 105.01 | 107.75 | Proctor, pcf | 111.61 | Proctor, pcf | 103.89 |
| Density, pcf | 73.34 | 75.00 | Density, pcf | 86.91 | Density, pcf | 95.81 |
| Density Reduction, % | 30.16 | 27.61 | Density Reduction, % | 19.02 | Density Reduction, % | 7.78 |

*Prehydrated at 6% moisture
**Prehydrated at 10% moisture
***Retarder Added

The addition of lightweight additives to coal combustion ashes appears to be successful in establishing the desired density levels. However, there is an associated decrease in strength with decreasing density. This relationship is illustrated in the examples shown in Tables 12 and 13 for the CFBC ash and the Class C ashes.

TABLE 12

Summary of Strength and Density Data Resulting from Addition of Lightweight Additives to CFBC Ashes.

| Mix Proportions | Test Ctl | Test C | Test B | Test A | Test F | Test D-1 | Test D-2 |
|---|---|---|---|---|---|---|---|
| Fly Ash, % of ash | 60 | 60 | 60 | 60 | 60 | 60 | 60 |
| Bed Ash, % of ash | 40 | 40 | 40 | 40 | 40 | 40 | 40 |
| Aluminum Powder, % of solids | — | 0.5 | 1 | 2 | 4 | — | — |
| LW Additive, ml/tonne | — | — | — | — | — | 33 | 163 |
| Water, % of ash | 37.5 | 37.5 | 37.5 | 37.5 | 37.5 | 37.5 | 37.5 |
| Geotechnical Properties | | | | | | | |
| UCS @ 28d, psi (1) | 2214 | 1085 | 1094 | 956 | 631 | 968 | 143 |
| UCS @ 28d, psi (2) | 2238 | 7.5 | 990 | 891 | 583 | 1060 | 150 |
| Density, pcf | 108.1 | 102.2 | 101.6 | 100.5 | 61.57 | 95.50 | 63.33 |

(1) Sealed 23° C. curing conditions
(2) Humid 23° C. curing conditions
(3) 71 ° C. curing conditions
LW — lightweight; UCS — unconfined compressive strength The additive or specialty chemicals proposed benefit the cold bonding process and product in increasing strength, reducing dimensional instability and in improving soundness durability. Waste water treatment liquors, such as cooling tower blowdown, can be incorporated in the aggregate product. The addition of the lightweight additive can be effective for certain ashes in reducing the density for lightweight aggregate production. The use of chemical additives for bubble production appears to be equally effective for lightweight aggregate product via the aggregate process.

TABLE 13

Summary of Strength and Density Data Resulting from Addition of Synthetic aggregate Additives to Class C and Spray Dryer Ashes.

| Mix Proportions, % of mix | Test A | Test D | Test F | Test B | Test C |
|---|---|---|---|---|---|
| Unit 1&2 Ash (Class C) | 61.0% | 81.0% | 61.5% | — | — |
| Unit 3 Ash (Spray Drier) | 20.3% | — | 20.5% | 72.1% | 67.1% |
| Strength Additives, Lime | — | — | — | — | 3.4% |

TABLE 13-continued

Summary of Strength and Density Data Resulting from Addition of Synthetic aggregate Additives to Class C and Spray Dryer Ashes.

| Mix Pro-portions, % of mix | Test A | Test D | Test F | Test B | Test C |
|---|---|---|---|---|---|
| Set Retarders, | — | 0.4% | — | — | — |
| LW Additives, Al Powder | 0.8% | 0.8% | — | 0.7% | 0.7% |
| Water, | 17.9% | 17.8% | 18.0% | 27.2% | 28.8% |
| Geotechnical Properties | | | | | |
| UCS @ 28d, psi (1) | 2183 | 2016 | 3290 | 726 | 900 |
| UCS @ 28d, psi (2) | 2050 | 1694 | 3290 | 679 | 395 |
| Density, pcf (3) | 105.2 | 112.8 | 127.1 | 91.29 | 91.43 |

(1) Sealed 23° C. curing conditions
(2) Humid 23° C. curing conditions
(3) 73° F. curing conditions
UCS — unconfined compressive strength

EXAMPLES

A series of preliminary verification tests was conducted to confirm the chemical additives and other process options, as well as to provide information needed to assess the relative economics of the process. Both pilot-scale pelletizing trials and aggregate quality testing were conducted.

A series of pelletizing trials was conducted to ascertain the process behavior and water requirements and to generate sufficient aggregate for testing. Chemicals for control of the flash setting of the Class C ashes were also employed. Since $CaSO_4$, known to be a retarder, is present in the Unit 3 fly ash, testing of a combination of Unit 1 and 2 ashes with the Unit 3 ash was conducted. Pelletizing trials were also conducted using additives to enhance strength development, particularly with the Class F fly ashes. The results of the pelletizing trials using Class C ash and Class F ash are presented in Tables 14 and 15. The results indicate that heat/steam curing may be beneficial to the strength development of the pelletized Class F ashes, but not necessarily to the Class C ashes. Aggregate produced from the pelletizing trials was subjected to a series of ASTM and AASHTO tests used by the construction industry to qualify aggregate for construction-related applications. The results of the aggregate tests are presented in Tables 14 and 15.

The results indicate that the pelletized material made from Class C ashes exhibit sufficient strength and resistance to Los Angeles (LA) abrasion to meet the ASTM and AASHTO requirement of a maximum of 40% loss. Certain of the pelletized materials made from Class F ashes, in particular those cured at elevated temperature, also met the ASTM and AASHTO specifications. Although the room temperature aggregate showed very low early strengths, the strength increased with time to become comparable to the 180° F. cured pellets after 90 days.

TABLE 14

Summary of the Synthetic aggregate Pelletizing Trials Using Class C Fly Ash

| | Trial A-1 | Trial A-1 | Trial A-2 | Trial A-2 |
|---|---|---|---|---|
| Mix Components, lb | | | | |
| Class C Fly Ash | 95.7 | 95.7 | — | — |
| Spray Drier Ash | 191.4 | 191.4 | 100 | 100 |
| Additive | — | — | 5 | 5 |
| Water-Pin Mixer | 44.6 | 44.6 | 23.1 | 23.1 |
| Curing Conditions | | | | |
| Temperature, ° F. | 73° F. | 180° F. | 73° F. | 180° F. |
| Sealed or Covered | Covered | Sealed-10 hrs | Covered | Sealed-10 hrs |
| Crush Strength, lb | | | | |
| 24 hrs | 258 | 265 | 100 | 206 |
| 48 hrs | 347 | 251 | 168 | 171 |
| 7 days | 291 | 204 | 381 | 234 |
| 28 days | 323 | 224 | 358 | 246 |
| 90 days | nd | 311 | 388 | 370 |
| LA Abrasion Resistance | | | | |
| Grade | B | B | B | B |
| Loss at 28 days, % | 31.68 | 41.00 | 25.34 | 27.16 | nd - not determined: Water added to pan not determined

TABLE 15

Summary of Synthetic aggregate Pelletizing Trials Using Class F Fly Ash

| | Trial B-1 | | Trial B-2 | | Trial B-3 | | Trial B-4 | |
|---|---|---|---|---|---|---|---|---|
| Mix Components, lb | | | | | | | | |
| Class F | 25 | | — | | 25 | | 100 | |
| Off-Spec Class F | — | | 50 | | — | | — | |
| Spray Drier Ash | 75 | | 50 | | 75 | | — | |
| Additive | — | | 5 | | 5 | | 5 | |
| Water-Pin Mixer | 15.95 | | 15.15 | | 19.15 | | 15.25 | |
| Curing Conditions | | | | | | | | |
| Temperature, ° F. | 73° F. | 180° F. | 73° F. | 180° F. | 73° F. | 180° F. | 73° F. | 180° F. |
| Sealed or Covered | Covered | Sealed 10 hrs | Covered | Sealed 10 hrs | Covered | Sealed 10 hrs | Covered | Sealed 10 hrs |

TABLE 15-continued

Summary of Synthetic aggregate Pelletizing Trials Using Class F Fly Ash

|  | Trial B-1 | | Trial B-2 | | Trial B-3 | | Trial B-4 | |
| --- | --- | --- | --- | --- | --- | --- | --- | --- |
| Crush Strength, lb | | | | | | | | |
| 24 hrs | 28 | 30 | 14 | 114 | 15 | 99 | 37 | 199 |
| 48 hrs | nd | nd | 25 | 94 | 22 | 73 | 31 | 144 |
| 7 days | 40 | 65 | 19 | 102 | 19 | 74 | 35 | 154 |
| 28 days | 128 | 123 | 111 | 119 | 84 | 92 | 58 | 112 |
| 90 days | 218 | 188 | 173 | 115 | 104 | 263 | 99 | 133 |
| L. A. Abrasion Resistance | | | | | | | | |
| Grade | B | B | B | B | B | B | B | B |
| Loss at 28 days, % | 44.70 | 42.24 | 33.46 | 28.80 | 44.90 | 38.38 | 81.04 | 41.94 | nd — not determined: Water added to pan not determined

In addition to the testing of the pelletization of Class C and Class F ashes shown in Table 14 and 15, ash from the CFBC facility was also tested according to the AET process (U.S. Pat. No. 5,137,753). These ashes have not been treated with chemicals that could provide additional strength and dimensional stability. The aggregate produced was testing for product quality and the results are presented in Table 16. The results indicate that the LA abrasion resistance specifications can be met. In addition, the aggregate with treatment with soluble carbonate as used in the aggregate process can also meet the soundness requirements for construction aggregate. Table 16 also shows the effect of heat curing of the aggregate on product quality. Although the aggregate that is heat cured for 20 hours shows superior crush strength, the room temperature cured aggregate approaches the crush strength at 28 days. The heat cured aggregate actually showed a decrease in crush strength after 28 days, probably due to lack of water for further hydration reactions that provide strength.

The aggregate was also tested for freeze/thaw durability. Although there is no specification via ASTM for freeze/thaw durability, most construction aggregates show less than 10% loss. The AET aggregate showed losses in the 25 to 27% range. These tests were not conducted on the aggregate chemically treated aggregates, which are expected to be within the accepted range of other construction aggregates.

TABLE 16

Summary of the Pelletizing Trials and Aggregate Quality of the CFBC Ash

| Cedar Bay | Trial 6 | | Trial 7 | | Trial 8 | |
| --- | --- | --- | --- | --- | --- | --- |
| Mix Proportions, lbs | | | | | | |
| CFBC FA | 75 | | 100 | | 100 | |
| CFBC HBA* | 50 | | 50 | | 25 | |
| Raw BA | 25 | | | | 25 | |
| Mixer Water | 18.80 | | 17.30 | | 19.40 | |
| Pan Water | 22.15 | | 36.05 | | 27.15 | |
| Curing Conditions | | | | | | |
| Temperature ° F. | 160 | 70 | 160 | 70 | 160 | 70 |
| Coating - AET process | HBA | HBA | HBA | HBA | HBA | HBA |
| Crush Strength, lbs | | | | | | |
| 24 hrs | 232 | 11 | 168 | 8 | 192 | 7 |
| 48 hrs | 259 | 16 | 186 | 10 | 194 | 15 |
| 7 day | 255 | 52 | 137 | 29 | 213 | 50 |
| 28 days | 174 | 160 | 135 | 74 | 169 | 98 |

TABLE 16-continued

Summary of the Pelletizing Trials and Aggregate Quality of the CFBC Ash

| Cedar Bay | Trial 6 | Trial 7 | Trial 8 |
| --- | --- | --- | --- |
| LA Abrasion Resistance | | | |
| Grade | B | B | B |
| Loss at 28 days, % | 28.52 | 34.3 | 28.95 |
| Soundness | | | |
| No Treatment | | | |
| Loss-Water Only Cycles | 99.64% | nd | nd |
| Treated-Soluble Carbonates | | | |
| Loss Water Only Cycles | 17.98% | nd | nd |
| Loss Magnesium Sulfate Sol. Cycles | 8.22% | nd | nd | nd — not determined
BA hydrated at 9% moisture

The discussion and examples included in this application are intended to serve as a basic description. The reader should be aware that the specific discussion may not explicitly describe all embodiments possible; many alternatives are implicit. The market place and manufacturing concerns may dictate the appropriate embodiments for the present invention. Particularly with respect to the discussion, it should be understood that a number of changes may be made without departing from the essence of the present invention. In this regard, it is intended that such changes—to the extent that they substantially achieve the same results in substantially the same way—will still fall within the scope of the present invention. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus discussions or claims may not only be included for the device described, but also method or process claims may be included to address the functions the invention and each element performs. Although the methods related to the system are being included in various detail. Naturally, that discussion could have some application to the various other methods and apparatus discussed throughout the disclosure. This is particularly true for the present invention since its basic concepts and understandings may be broadly applied. Neither the description nor the terminology is intended to limit the scope of the claims.

It should be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure. In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "mixer" should be understood to encompass disclosure of the act of "mixing"—whether explicitly discussed or not—and, conversely, were there only disclosure of the act of "mixing", such a disclosure should be understood to encompass disclosure of a "mixer." Such changes and alternative terms are to be understood to be explicitly included in the description.

Any references mentioned in the application for this patent as well as any references listed in any information disclosure filed with the application are hereby incorporated by reference; however, to the extent statements might be considered inconsistent with the patenting of this/these invention(s) such statements are expressly not to be considered as made by the applicant(s).

Finally, the applicant should be understood to have the right to claim the various permutations and combinations of every feature, component, step, and element disclosed.

I claim:

1. A method of generating a combustion ash composition comprising the steps of:
   providing combustion ash having an amount of hydratable oxide;
   assessing said amount of hydratable oxide in said combustion ash;
   assessing a first amount of water to convert said amount of hydratable oxide to about five weight percent;
   combining at least said first amount of water with said combustion ash to generate a partially hydrated combustion ash;
   converting said amount of hydratable oxide to about five weight percent;
   expanding said partially hydrated combustion ash to a first molar expansion volume;
   allowing said partially hydrated combustion ash to heat as a result of exothermic hydration of said hydratable oxides;
   permitting evaporation or a portion of said first amount of water from said partially hydrated combustion ash;
   assessing a second amount of water to convert substantially all of the remaining hydratable oxide to hydroxide; and
   adding at least said second amount of water to said partially hydrated combustion ash to generate a combined material.

2. A method of generating a combustion ash composition as described in claim 1 further comprising the step of compacting said combined material and allowing said compacted combined material to cure to form a stable compacted cured material.

3. A method of generating a combustion ash composition as described in claim 1 wherein said step of combining at least said first amount of water with said combustion ash, and said step of adding at least said second amount of water to said partially hydrated combustion ash comprises utilizing a water weight of about 10% to about 60% of said combustion ash.

4. A method of generating a combustion ash composition as described in claim 2 further comprising the step of reducing average pore volume of said stable compacted cured material.

5. A method of generating a combustion ash composition as described in claim 4 wherein said stop of reducing an average pore volume of said stable compacted cured material comprises the step of establishing said average pore volume of said stable compacted cured material to between about 15% to about 40%.

6. A method of generating a combustion ash composition as described in claim 2 further comprising the step of adding an amount of pore filling controlling compound to said combustion ash insufficient to fill a pore volume of said stable compacted cured material.

7. A method of generating a combustion ash composition as described in claim 6 further comprising the stop of generating an amount of non-pore filling compound by reacting an amount of precursor pore filling compound in said combustion ash with said amount of said pore filling controlling compound.

8. A method of generating a combustion ash composition as described in claim 1 further comprising the step of adding an amount of strength additive to said partially hydrated combustion ash.

9. A method of generating a combustion ash composition as described in claim 5 wherein said step of providing said combustion ash comprises the atop of providing a combustion ash selected from the group consisting of fluidized bed combustion ash, pressurized fluidized bed combustion ash, off specification Class C ash, off specification Class F ash, spray drier ash, sorbent injection ashes, incinerator ash, and flue gas desulfurization ash.

10. A method of generating a combustion ash composition as described in claim 6 wherein said step of providing a pore filling controlling compound comprises providing a pore filling controlling compound selected from the group consisting of carbon dioxide gas, soluble carbonates, carbonic acid, sodium carbonate, potassium carbonate, magnesium hydroxide, and trona.

11. A method of making a material from combustion ash as described in claim 7 wherein said precursor pore filling compound is selected from the group consisting of calcium oxide, $Ca^{2+}$, magnesium oxide, soluble sulfates, soluble alumina, soluble silicates, calcium silicate, calcium aluminate, hydrated lime, and calcium sulfo-aluminate.

12. A method of generating a combustion ash composition as described in claim 8 wherein said step of adding said strength additive to said partially hydrated combustion ash comprises the step of adding a strength additive selected from the group consisting of Portland Cement, Class C ash, hydrated lime, lime, soluble silicates, soluble aluminates and self cementing ash.

13. A method of generating a combustion ash composition as described in claim 1 further comprising the step of selecting said first amount of water and said second amount of water from the group consisting of coal pile runoff, cooling tower blow down, paper mill effluent, industrial waste waters, and seawater.

14. A method of generating a combustion ash composition as described in claim 1 further comprising the step of establishing a combustion ash composition to meet specifications selected from the group consisting of normal weight aggregate for road base, concrete aggregate, structural fill, liners, ASTM 698, ASTM 1557, ASTM C-88 soundness index, and ASTM LA abrasion.

15. A method of generating a combustion ash composition as described in claim 2 further comprising the step of providing a minimal amount of linear expansion of said stable compacted cured material.

16. A method of generating a combustion ash composition as described in claim 1 wherein said step of combining at least said first amount of water with said combustion ash comprises the step of combining said first amount of water and additional water to accommodate for said evaporation from said combustion ash.

17. A method of generating a combustion ash composition as described in claim 1 wherein said step of adding at least said second amount of water to said partially hydrated combustion ash comprises the step of adding said second amount of water and additional water sufficient to satisfy compaction requirements.

18. A method of generating a combustion ash composition as described in claim 2 wherein said steps of compacting said combined material and allowing said compacted combined material to cure to form a stable compacted cured material comprises the stop of selecting a compaction method from the group consisting of pelletization, briquetting, and agglomeration.

19. A method of generating a combustion ash composition as described in claim 2 wherein said steps of compacting said combined material and allowing said compacted combined material to cure to form a stable compacted cured material comprises the step of compacting said combined material by roller compaction.

20. A method of generating a combustion ash composition as described in claim 1 further comprising the step of adding a precursor pore filling compound and a strength additive to said partially hydrated combustion ash.

21. A method of generating a combustion ash composition as described in claim 1 further comprising the step of adding a precursor pore filling compound and a strength additive to said combustion ash.

22. A method of generating a combustion ash composition as described in claim 15 wherein said step of providing a minimal amount of linear expansion of said stable compacted cured material comprises the atop of providing an amount of linear expansion selected from the group consisting of about 0.100 percent in a saturated bath, about 0.050 percent in a saturated bath, and about 0.010 percent in a saturated bath.

23. A method of generating a combustion ash composition as described in claim 1 wherein said step of combining at least said first amount of water with said combustion ash comprises the step of high energy mixing at least said first amount of water and said combustion ash.

24. A method of generating a combustion ash composition as described in claim 1 wherein said step of combining at least said first amount of water with said combustion ash comprises the step of low energy mixing said first amount of water and said combustion ash.

25. A method of generating a combustion ash composition as described in claim 1 or 24 wherein said step of adding at least said second amount of water to said partially hydrated combustion ash comprises the step of high energy mixing at least said second amount of water with said partially hydrated combustion ash.

26. A method of generating a combustion ash composition as described in 23 wherein said step of high energy mixing comprises the step of mixing said water and said combustion ash substantially equivalent to mixing at a level one speed for about one minute and a level two speed for between about ten and about twelve minutes in a Hobart mixer.

27. A method of generating a combustion ash composition as described in 23 wherein said step of high energy mixing comprises the stop of mixing said water and said combustion ash substantially equivalent to mixing at least at a level two speed for greater than about two minutes in a Hobart mixer.

28. A method of generating a combustion ash composition as described in claim 2 and further comprising compacting said combined material with a reduced compactive effort.

29. A method of making a material from combustion ash as described in claim 28 wherein said step of compacting said combined materials with a reduced compactive effort comprises compacting said combined material with a compactive effort less than ASTM P698 compactive effort to substantially achieve an equivalent ASTM D698 compactive density.

30. A method of making a material from combustion ash as described in claim 28 further comprising the step of compacting said combined material with a compactive effort less then ASTM D1557 compactive effort to substantially achieve an equivalent ASTM D1557 compactive density.

31. A method of making a material from combustion ash as described in claim 28 further comprising the step of using ASTM D698 compactive effort to achieve a compacted material density of ASTM 1557 compactive effort.

32. A method of generating a combustion ash composition as described in claim 2 further comprising the step of compacting said combined material with a compactive effort selected from the group consisting of ASTM D698 and ASTM D1557.

33. A method of generating a combustion ash composition as described in claim 2 or 29 further comprising the step of providing said stable compacted cured material having a density selected from the group consisting of greater than about 90 pounds per cubic foot;
greater than about 100 pounds per cubic foot;
greater than about 110 pounds per cubic foot; and
greater than about 112 pounds per cubic foot.

34. A method of making a material from combustion ash as described in claim 20 or 21 wherein said precursor pore filling compound is selected from the group consisting of calcium oxide, $Ca^{2+}$, magnesium oxide, soluble sulfates, soluble alumina, soluble silicates, calcium/silicate, calcium aluminate, hydrated lime, and calcium sulfo-aluminate.

35. A method of generating a combustion ash composition as described in claim 20 or 21 wherein said step of adding said strength additive to said combustion ash comprises adding a strength additive selected from the group consisting of Portland Cement, Class C ash, hydrated lime, lime, soluble silicates, soluble aluminates and self cementing ash.

36. A product produced in accordance with the process of any one of claims 1, 3, 5, 7, 14, 27, or 32.

37. A method of making a material from combustion ash comprising the steps of:
selecting a combustion ash;
determining an amount of water to be added to said combustion ash;
combining said water with said combustion ash;
high energy mixing said combustion ash with said water; and
compacting said ash and water mixture with a reduced compactive effort.

38. A method of making a material from combustion ash as described in claim 37 wherein said step of compacting said ash and water mixture with a reduced compactive effort comprises a stop of compacting said ash and water mixture with a compactive effort less than ASTM D698 compactive effort to substantially achieve an equivalent ASTM D698 compactive density.

39. A method of making a material from combustion ash as described in claim 37 wherein said step of compacting said ash and water mixture with a reduced compactive effort comprises a step of compacting said ash and water mixture with a compactive effort less than ASTM D1557 compactive effort to substantially achieve an equivalent ASTM D1557 compactive density.

40. A method of making a material from combustion ash as described in claim 37 wherein said step of compacting said ash and water mixture with a reduced compactive effort comprises the step of using ASTM D698 compactive effort to achieve a compacted material density of ASTM 1557 compactive effort.

41. A method of making a material from combustion ash as described in claim 37, 38, 39 or 40 wherein said step of high energy mixing said combustion ash with said water comprises the atop of increasing the density of said compacted ash.

42. A method of making a material from combustion ash as described in claim 41 wherein said step of increasing the density of said compacted ash comprises the step of providing a compacted ash density selected from the group consisting of:
greater than about 90 pounds per cubic foot;
greater than about 100 pounds per cubic foot;
greater than about 110 pounds per cubic foot; and
greater than about 112 pounds per cubic foot.

43. A method of making a material from combustion ash as described in claim 41 wherein said step of increasing the density of said compacted ash comprises the step of providing a compacted ash density between about 60 and about 90 pounds per cubic foot.

44. A method of making a material from combustion ash as described in claim 37 wherein said step of high energy mixing said combustion ash with said water comprises the step of mixing said combustion ash and water substantially equivalent to mixing at a level one speed for about one minute and a level two speed for between about ten and about twelve minutes in a Hobart mixer.

45. A method of making a material from combustion ash as described in claim 37 wherein said step of high energy mixing said combustion ash with said water comprises the step of mixing said combustion ash and said water substantially equivalent to mixing at a least at a level two speed for greater than two minutes in a Hobart mixer.

46. A method of making a material from combustion ash as described in claim 37, 38 or 45 further comprising the step of establishing a high energy pore volume in a cured combustion ash mixture.

47. A method of making a material from combustion ash as described in claim 46 wherein said step of establishing a high energy pore volume in a cured combustion ash mixture comprises the step of establishing an average pore volume of said cured combustion ash between about 15% and about 40%.

48. A method of making a material from combustion ash as described in claim 37 wherein said step of determining an amount of water to be added to said combustion ash comprises the step of utilizing said amount of water having a water weight between about 10% and about 60% of said combustion ash.

49. A method of making a material from combustion ash as described in claim 37 wherein said step of selecting said combustion ash comprises selecting a combustion salt having hydratable oxide.

50. A method of making a material from combustion ash as described in claim 49 further comprising the step of converting said hydratable oxide to hydroxide with said amount of water.

51. A method of making a material from combustion ash as described in claim 49 further comprising the steps of:
assessing a first amount of water to convert said amount of hydratable oxide to about five weight percent;
combining at least said first amount of water with said combustion ash to create a partially hydrated combustion ash;
converting said amount of hydratable oxide to about five weight percent;
expanding said partially hydrated combustion ash to a first molar volume;
allowing said partially hydrated combustion ash to heat as a result of exothermic hydration of said hydratable oxides;
permitting evaporation of a portion of said first amount of water from said combined materials;
assessing a second amount of water to convert substantially all of the remaining hydratable oxide to hydroxide; and
adding at least said second amount of water to said partially hydrated combustion ash.

52. A method of making a material from combustion ash as described in claim 51 wherein said step of combining at least said first amount of water with said combustion ash comprises the step of combining said first amount of water and additional water to accommodate for said evaporation from said combustion ash.

53. A method of making a material from combustion ash as described in claim 51 wherein said step of adding at least said second amount of water to said partially hydrated combustion ash comprises the step of adding said second amount of water and additional water sufficient to satisfy compaction requirements.

54. A method of making a material from combustion ash as described in claim 51 wherein said step of high energy mixing said combustion ash with said water comprises the step of high energy mixing said at least said second amount of water with said partially hydrated combustion ash.

55. A method of making a material from combustion ash as described in claim 37 wherein said step of selecting a combustion ash comprises the step of selecting a combustion ash having a precursor pore filling compound.

56. A method of making a material from combustion ash as described in claim 55 further comprising the step of adding a pore filling controlling compound to said combustion ash having a precursor pore filling compound.

57. A method of making a material from combustion ash as described in claim 56 further comprising the step of forming a non-pore filling compound from the reaction of said precursor pore filling compound and said pore filling controlling compound.

58. A method of making a material from combustion ash as described in claim 37 further comprising the step of allowing said compacted combustion ash to cure to form a stable compacted cured material.

59. A method of making a material from combustion ash as described in claim 37 further comprising the step of providing a minimal amount of linear expansion of a stable compacted cured material.

60. A method of making a material from combustion ash as described in claim 59 wherein said step of providing a minimal amount of linear expansion of said stable compacted cured material comprises the step of providing an amount of linear expansion selected from the group consisting of about 0.100 percent in a saturated bath, about 0.050 percent in a saturated bath, and about 0.010 percent in a saturated bath.

61. A method of making a material from combustion ash as described in claim 37 wherein said step of compacting said ash and water mixture comprises the step of selecting a compaction method from the group consisting of pelletization, briquetting, and agglomeration.

62. A method of making a material from combustion ash as described in claim 37 wherein said step of compacting said ash and water mixture comprises the step of compacting said ash and water mixture by roller compaction.

63. A method of making a material from combustion ash as described in claim 37 further comprising adding a strength additive to said combustion ash.

64. A method of making a material from combustion ash as described in claim 37 further comprising the step of adding a precursor pore filling compound and a strength additive to said combustion ash.

65. A method of making a material from combustion ash as described in claim 63 or 64 wherein said step of adding a strength additive to said combustion ash comprises the step of adding a strength additive selected from the group consisting of Portland Cement, Class C ash, hydrated lime, lime, soluble silicates, soluble aluminates and self cementing ash.

66. A method of making a material from combustion ash as described in claim 37 wherein said step of selecting a combustion ash comprises the step of avoiding a fluidized bed combustion ash.

67. A method of making a material from combustion ash as described in claim 37 wherein said step of selecting a combustion ash comprises the step of avoiding a fluidized bed combustion residue (FBCR) ash.

68. A method of making a material from combustion ash as described in claim 37 wherein said step of selecting a combustion ash comprises the step of selecting a combustion ash from the group consisting of fluidized bed combustion ash, pressurized fluidized bed combustion ash, Class C ash, off specification Class C ash, Class F ash, off specification Class F ash, spray drier ash, sorbent injection ashes, incinerator ash, and flue gas desulfurization ash.

69. A method of making a material from combustion ash as described in claim 56 wherein said step of adding a pore filling controlling compound comprises the step of selecting a pore filling controlling compound from the group consisting of carbon dioxide gas, soluble carbonates, carbonic acid, sodium carbonate, potassium carbonate, magnesium hydroxide, and trona.

70. A method of making a material from combustion ash as described in claim 55 wherein said step of selecting a combustion ash comprises the step of selecting a combustion ash having a precursor pore filling compound, wherein said precursor pore filling compound is selected from the group consisting of calcium oxide, $Ca^{2+}$, magnesium oxide, soluble sulfates, soluble alumina, soluble silicates, calcium silicate, calcium aluminate, hydrated lime and calcium sulfo-aluminate.

71. A method of making a material from combustion ash as described in claim 56 wherein said combustion ash, said water, and said pore filling controlling compound are combined to create a combination material and said combination material has a pH greater than about 10.

72. A method of making a material from combustion ash as described in claim 37 where said step of determining said amount of water to be added to said combustion ash comprises the step of selected said water from the group consisting of coal pile runoff, cooling tower blow down, paper mill effluent, industrial waste waters, and seawater.

73. A product made through use of the methods described in claims 37, 28, 45, 60, or 66.

74. A product made through use of the methods described in claim 73 further comprising the step of providing a product which meets specifications, said specifications selected from the group consisting of normal weight aggregate for road base, concrete aggregate, structural fills, liners, ASTM 698, ASTM 1557, ASTM C-88 soundness index, and ASTM LA abrasion standards.

75. A cured combustion ash composition comprising:
a combustion ash;
a minimal linear expansion capability of said cured combustion ash composition; and
substantially no hydratable oxide in said cured combustion ash composition.

76. A cured combustion ash composition as described in claim 75 wherein said combustion ash comprises combustion ash having originally had hydratable oxide.

77. A cured combustion ash composition as described in claim 75 further comprising a reduced average pore volume of said cured combustion ash composition having a volume between about 15% to about 40% of said cured combustion ash composition volume.

78. A cured combustion ash composition as described in claim 77 wherein said reduced average pore volume comprises a high energy pore volume.

79. A cured combustion ash composition as described in claim 78 wherein said high energy pore volume comprises a pore volume substantially equivalent to a pore volume achieved when mixing at least at a level one speed for about one minute and a level two speed for between about ten and about twelve minutes in a Hobart mixer.

80. A cured combustion ash composition as described in claim 78 wherein said high energy pore volume comprises a pore volume substantially equivalent to a pore volume achieved when mixing at least at a level two speed for greater than two minutes in a Hobart mixer.

81. A cured combustion ash composition as described in claim 75 wherein said minimal amount of linear expansion capability comprises an amount of linear expansion of said combustion ash composition selected from the group consisting of about 0.100 percent in a saturated bath, about 0.050 percent in a saturated bath, and about 0.010 percent in a saturated bath.

82. A cured combustion ash composition as described in claim 75 further comprising an unconfined compressive strength of at least 1000 pounds per square inch for said cured composition.

83. A cured combustion ash composition as described in claim 75 further comprising an unconfined compressive strength of said cured composition selected from the group consisting of greater than 700 pounds per square inch;

greater than 1000 pounds per square inch;

greater than 1300 pounds per square inch;

greater than 1600 pounds per square inch;

greater than 2000 pounds per square inch; and greater than 3000 pounds per square inch.

84. A cured combustion ash composition as described in claim 75 wherein said cured combustion ash composition comprises a cured combustion ash composition resulting from a compactive effort less than ASTM D698 compactive effort to substantially achieve an equivalent ASTM D698 compactive density.

85. A cured combustion ash composition as described in claim 75 wherein said cured combustion ash composition comprises a cured combustion ash composition resulting from a compactive effort less than ASTM D1557 compactive effort to substantially achieve an equivalent ASTM D1557 compactive density.

86. A method of making a material from combustion ash as described in claim 75 wherein said cured combustion ash composition comprises a cured combustion ash composition resulting from using ASTM D698 compactive effort to achieve a compacted material density of ASTM 1557 compactive effort.

87. A cured combustion ash composition as described in claim 75 or 84 wherein said cured combustion ash composition has a density selected from the group consisting of:

greater than about 90 pounds per cubic foot;

greater than about 100 pounds per cubic foot;

greater than about 110 pounds per cubic foot; and greater than about 112 pounds per cubic foot.

88. A cured combustion ash composition as described in claim 75 or 84 wherein said cured combustion ash composition has a density between about 60 and about 90 pounds per cubic foot.

89. A cured combustion ash composition as described in claim 75 further comprising a non-pore filling compound.

90. A cured combustion ash composition as described in claim 75 wherein said combustion ash is selected from the group consisting of fluidized bed combustion ash, pressurized fluidized bed combustion ash, Class C ash, off specification Class C ash, Class F ash, off specification Class P ash, spray drier ash, sorbent injection ashes, incinerator ash, and flue gas desulfurization ash.

91. A cured combustion ash composition as described in claim 75 further comprising a strength additive.

92. A cured combustion ash composition as described in claim 91 wherein said strength additive is selected from the group consisting of Portland Cement, Class C ash, hydrated lime, lime, and self cementing ash.

93. A cured combustion ash composition as described in claim 75 wherein said cured combustion ash composition comprises a composition which meets specifications, said specifications selected from the group consisting of normal weight aggregate for road base, concrete aggregate, structural fills, liners, ASTM 698, ASTM 1557, ASTM C-88 soundness index, and ASTM LA abrasion standards.

* * * * *

UNITED STATES PATENT AND TRADEMARK OFFICE
CERTIFICATE OF CORRECTION

PATENT NO. : 6,808,562 B2  Page 1 of 1
APPLICATION NO. : 10/327595
DATED : October 26, 2004
INVENTOR(S) : Alan E. Bland It is certified that error appears in the above-identified patent and that said Letters Patent is hereby corrected as shown below:

*The following paragraph should appear at Column 1, line 15:*

ACKNOWLEDGMENT OF GOVERNMENT SUPPORT

This patent relates to work performed under U.S. DOE Cooperative Agreement #DE-FC26-98FT40323. The U.S. government may have certain rights in this inventive technology, including "march-in" rights, as provided for by the terms of U.S. DOE Cooperative Agreement #DE-FC26-98FT40323.

Signed and Sealed this

Thirteenth Day of July, 2010

David J. Kappos
*Director of the United States Patent and Trademark Office*